(12) United States Patent
Slack et al.

(10) Patent No.: US 11,224,905 B2
(45) Date of Patent: *Jan. 18, 2022

(54) INJECTION TIP AND METHOD FOR NUCLEATING AND PROPAGATING HYDRAULIC FRACTURES FROM PROBE RODS

(71) Applicant: FRX, Inc., Cincinnati, OH (US)

(72) Inventors: William Slack, Cincinnati, OH (US); Chapman Ross, Arlington, MA (US); Neal Durant, Potomac, MD (US); Mads Terkelsen, Hilleroed (DK)

(73) Assignee: FRx, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,354

(22) Filed: Nov. 8, 2019

(65) Prior Publication Data

US 2020/0070224 A1 Mar. 5, 2020

Related U.S. Application Data

(62) Division of application No. 15/518,997, filed as application No. PCT/US2015/055963 on Oct. 16, 2015, now Pat. No. 10,471,484.

(Continued)

(51) Int. Cl.
*B09C 1/00* (2006.01)
*B09C 1/02* (2006.01)
*B09B 1/00* (2006.01)
*B09C 1/08* (2006.01)
*E21B 7/18* (2006.01)

(52) U.S. Cl.
CPC ............... *B09C 1/00* (2013.01); *B09B 1/00* (2013.01); *B09C 1/02* (2013.01); *B09C 1/08* (2013.01); *E21B 7/18* (2013.01); *B09C 2101/00* (2013.01)

(58) Field of Classification Search
CPC ................. E21B 43/26; E21B 7/18
See application file for complete search history.

(56) References Cited

U.S. PATENT DOCUMENTS

| 4,673,312 A | 6/1987 | Nussbaumer |
| 4,909,325 A | 3/1990 | Hopmann |

(Continued)

OTHER PUBLICATIONS

European Patent Office, Extended European Search Report, Application No. 15850991.9, dated Jun. 28, 2018 (7 pages).

*Primary Examiner* — Janine M Kreck

(74) *Attorney, Agent, or Firm* — Wood Herron & Evans LLP

(57) ABSTRACT

An injection tip assembly 10 and methods for use more reliably provide for delivery of fluid substances, such as materials that promote removal, destruction, or isolation of contaminants, into targeted zones within soil or bedrock. The injection tip assembly 10 permits the application of pressurized fluid 163 so as to erode or cut a desired cavity or eroded volume 164 within the subsurface 14, allows for timely observation, adjustment, and control of pressure within the cavity, and directs the delivery of a second substance or fluid that may incorporate desired materials. The consequence of managed erosion and pressure control is to nucleate and propagate a hydraulic fracture of desirable form that optimally delivers remedial agents throughout the targeted formation.

3 Claims, 17 Drawing Sheets

Related U.S. Application Data

(60) Provisional application No. 62/065,375, filed on Oct. 17, 2014.

(56) References Cited

U.S. PATENT DOCUMENTS

| | | | |
|---|---|---|---|
| 5,061,119 A * | 10/1991 | Balthaus | ............... E21B 17/18 405/128.45 |
| 5,133,625 A | 7/1992 | Albergo et al. | |
| 5,472,049 A | 12/1995 | Chaffee et al. | |
| 5,641,020 A | 6/1997 | Cherry et al. | |
| 6,274,048 B1 * | 8/2001 | Parker | ................... B09C 1/002 210/170.07 |
| 10,471,484 B2 * | 11/2019 | Slack | ....................... E21B 7/18 |
| 2003/0121701 A1 | 7/2003 | Polizzotti et al. | |
| 2005/0034901 A1 | 2/2005 | Meyer | |
| 2009/0069622 A1 | 3/2009 | Drucker | |

* cited by examiner

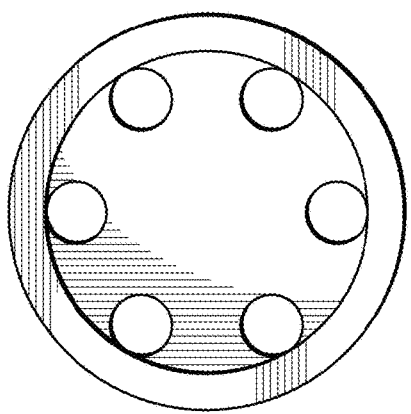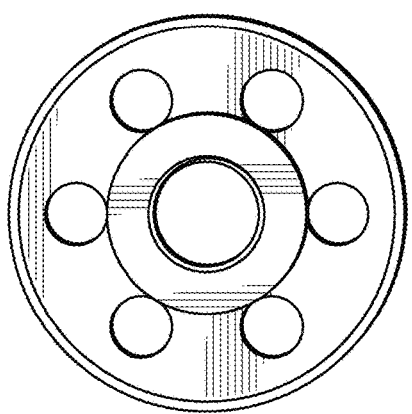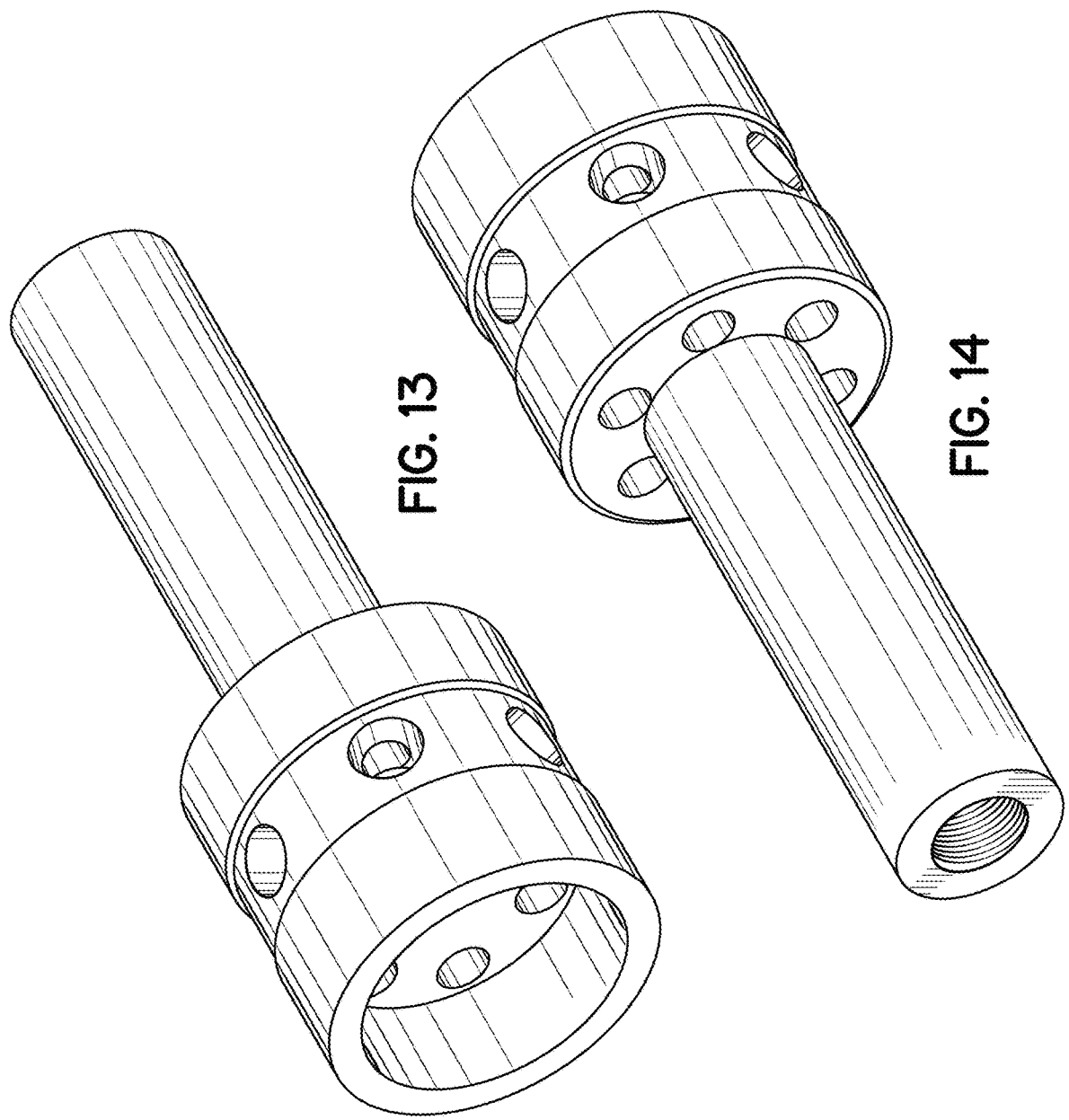

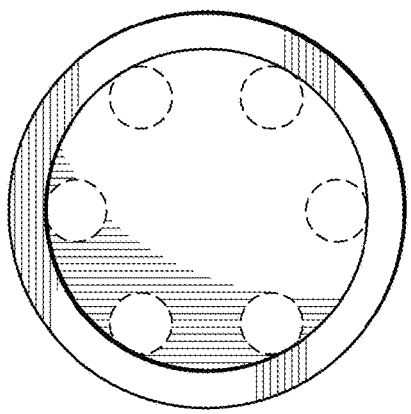
FIG. 19
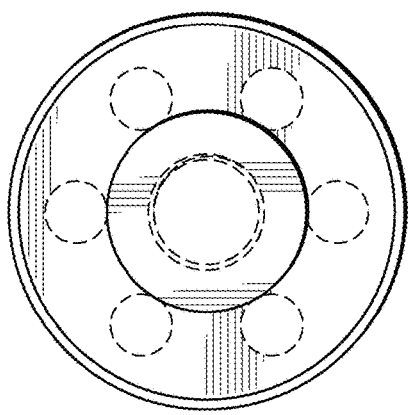
FIG. 20
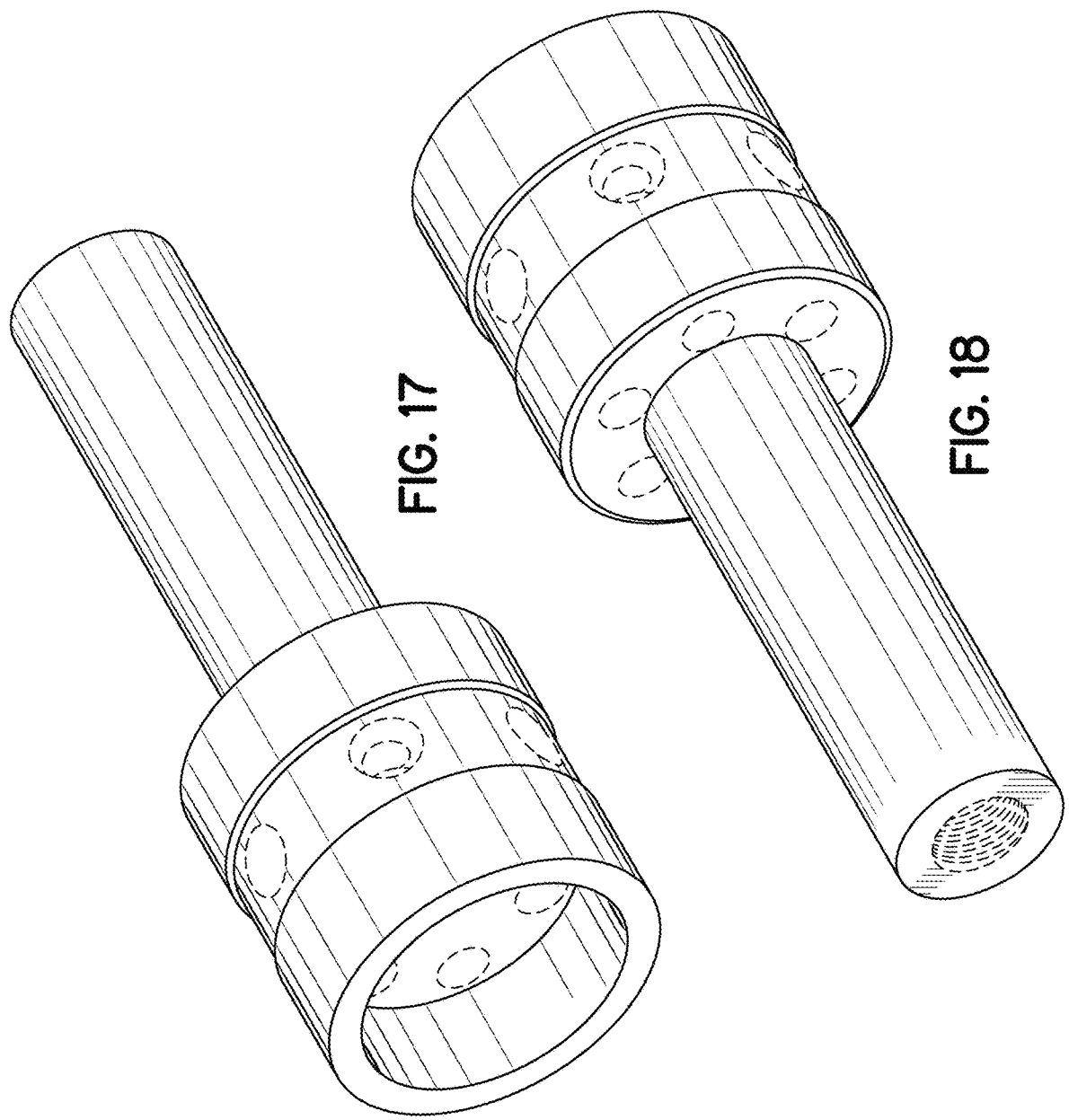
FIG. 17
FIG. 18

INJECTION TIP AND METHOD FOR NUCLEATING AND PROPAGATING HYDRAULIC FRACTURES FROM PROBE RODS

This application is a divisional of U.S. patent application Ser. No. 15/518,997, filed Apr. 13, 2017, which claims priority to PCT/US15/55963, filed Oct. 16, 2015, which claims priority to U.S. Provisional Application No. 62/065,375, filed Oct. 17, 2014, each of which is hereby expressly incorporated by reference into this application, in its entirety.

BACKGROUND

When ground, soil, or any subsurface becomes contaminated, remediation of the area is often considered. Heretofore, many methods of remediation of a contaminated subsurface required drilling a generally vertical bore hole from a surface into the contaminated subsurface, removing the boring device, and encasing the hole with a liner or casing, for example polyvinylchloride (PVC) piping. Thereafter, a remediation agent was delivered to the bottom of the bore hole through the PVC pipe casing. This technique has limited effect because of the small application area provided to the remediation agent at the bottom of the bore hole.

It was discovered that prior to delivery of the remediation agent through the PVC pipe casing, a jet cutting machine may be lowered into the bottom of the bore hole to cut various patterns in the contaminated subsurface to create a larger application area for the remediation agent. However, this technique has several drawbacks. One drawback is the PVC pipe casing limits the effectiveness and the spray pattern or the expulsion of the pressurized fluid. Another drawback relates to the runoff of the pressurized fluid after exposure to the contaminated subsurface, which must be transferred out of the bore hole in a controlled manner. Further, application of pressurized fluid into the bottom of the bore hole increases pressure inside the contaminated subsurface which leads to hydraulic fracturing of the subsurface in an uncontrolled manner.

The invention of more powerful direct push machines motivated the integration of injection nozzle orifices into the tip of a probe rod, which eliminates the need for drilling and depositing a PVC casing inside the bore hole. Using modern injection tips connected to probe rods, remediation agents are directed through probe rods and the nozzle orifice to apply the remediation agent to the contaminated substructure.

U.S. Pat. No. 5,733,067 issued to Hunt et al. is incorporated herein by reference to provide additional background information on problems faced when remediating a contaminated subsurface. Hunt et al. describes a method and system for bioremediation of contaminated soil using inoculated support spheres.

SUMMARY

The invention addresses these and other drawbacks associated with the prior art by providing a device for remediating a contaminated subsurface by producing an eroded volume having a desired shape in the contaminated subsurface for use in influencing the orientation and form of resulting hydraulic fractures. According to an embodiment of the invention, the device includes a nozzle head, an inner channel defined by the nozzle head, an outer channel defined by the nozzle head, a plurality of nozzle plugs removably secured to the nozzle head, a nozzle plug channel defined by each nozzle plug, wherein the nozzle plug channel is in fluid communication with the inner channel when the respective nozzle plug is removably secured to the nozzle head, and a plurality of fluid exchange sections defined by the nozzle head, wherein each fluid exchange section is in fluid communication with the outer channel.

According to another embodiment of the invention, a method is provided for remediating a contaminated subsurface by disposing an injection tip assembly into the contaminated subsurface, delivering a pressurized fluid to a nozzle head of the injection tip, spraying the pressurized fluid out of the nozzle head to erode a volume of the contaminated subsurface, collecting the sprayed pressurized fluid in to the nozzle head and delivering the collected sprayed pressurized fluid to the surface, delivering a remediation agent to the nozzle head, and dispersing the remediation agent out of the nozzle head and into the eroded volume to remediate the contaminated subsurface.

According to another embodiment of the invention, a method is provided for nucleating and propagating hydraulic fractures. The method comprises driving an injection tip into a subsurface, dispensing a first substance through the injection tip to form a cavity in the subsurface, and dispensing a second substance through the injection tip into the cavity. The method also comprises either controlling a pressure in the cavity through the injection tip directly to nucleate a hydraulic fracture from the cavity; or allowing, through the injection tip, a pressure in the cavity to nucleate a hydraulic fracture from the cavity. The allowing is accomplished by fabricating the injection tip such that the dispensing rate of either the first or second substance is correlated to the pressure required to nucleate a hydraulic fracture in the subsurface.

According to another embodiment of the invention, an injection tip for nucleating and propagating hydraulic fractures is provided. The injection tip extends from a first end to a second end and includes an outer opening defined by the injection tip. The injection tip further includes a first channel defined by the injection tip and extending from the first end to the outer opening, wherein the first channel is configured to selectively transfer substances therethrough. The injection tip further includes a second channel defined by the injection tip and extending from the first end to the outer opening, wherein the second channel is configured to selectively transfer substances therethrough.

According to another embodiment of the invention, an assembly is provided comprising a fluid control system for controlling the substances transferred into or out of an injection tip. The assembly further comprises a probe rod in fluid communication with the fluid control system, whereby the injection tip is coupled to the probe rode and in fluid communication with the fluid control system through the probe rod. The injection tip comprises a nozzle portion, a first channel defined by the nozzle head, wherein the first channel is configured to transfer a first substance from the fluid control system through the nozzle portion and to the exterior of the injection tip, and a second channel defined by the nozzle head, wherein the second channel is configured to transfer a second substance from the fluid control system through the nozzle portion and to the exterior of the injection tip.

These and other advantages and features, which characterize the invention, are set forth in the claims annexed hereto and forming a further part hereof. However, for a better understanding of the invention and of the advantages and objectives attained through its use, references should be made to the Drawings and to the accompanying descriptive matter, in which there is described exemplary embodiments of the invention.

DRAWINGS

The accompanying drawings, which are incorporated herein and constitute a part of this specification, illustrate various embodiments of the invention and, together with the general description of the invention given above, and the detailed description of the embodiments given below, serve to explain the embodiments of the invention.

FIG. 13 is a perspective view of an injection tip assembly of the present invention.

FIG. 14 is another perspective view thereof.

FIG. 15 is a bottom plan view thereof.

FIG. 16 is a top plan view thereof.

FIG. 17 is a perspective view of an injection tip assembly of the present invention with a set of openings shown in phantom.

FIG. 18 is another perspective view thereof with threads shown in phantom.

FIG. 19 is a bottom plan view thereof.

FIG. 20 is a top plan view thereof.

DETAILED DESCRIPTION

Figure 1:
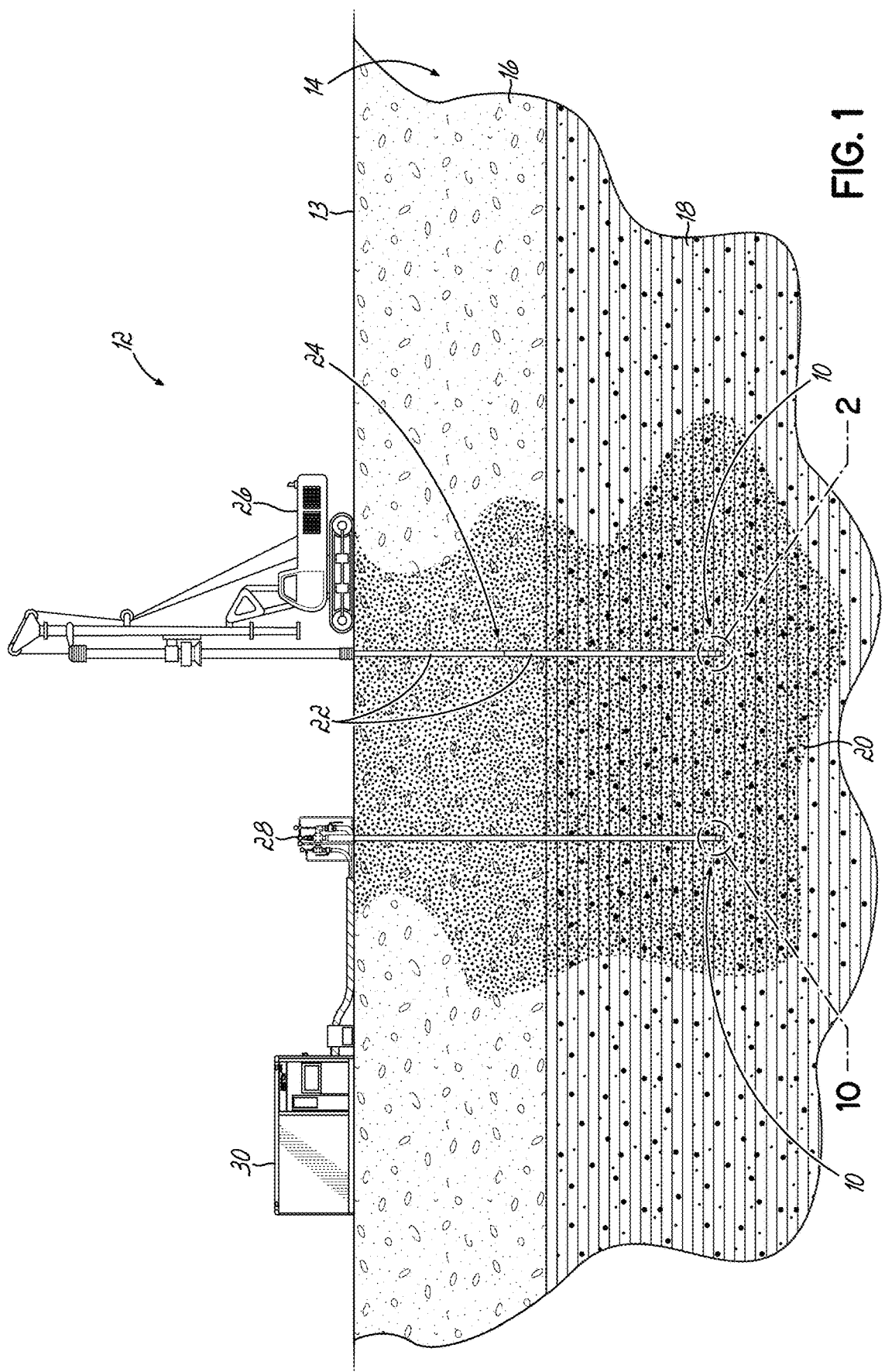
FIG. 1 is an elevational view of two exemplary injection tip assemblies of the present invention connected to rods and driven into a contaminated subsurface.

FIG. 1 illustrates an injection tip assembly 10 according to a preferred embodiment of the invention and shown in an operating environment 12. Operating environment 12 includes a surface 13, a subsurface 14 comprised of a first layer 16, a second layer 18, and a contaminated region 20 disposed in portions of both first layer 16 and second layer 18. Injection tip assembly 10 is removably connected to one or more probe rods 22 to form a rod assembly 24 of desired length. Rod assembly 24 is forced into subsurface 14 by way of a ramming machine 26 and thereafter selectively connected to a fluid control system for controlling the substances flowing through rod assembly 24. In the embodiment illustrated in FIG. 1, rod assembly 24 is capped with a fluid control system comprising a well head 28 and a fluid device 30. In this embodiment, one or more substances are supplied to well head 28 or retrieved from well head 28 by way of a fluid device 30.

FIGS. 2-5 illustrate the injection tip assembly 10, which extends from a first end 32 to a second end 34 and includes a drive point 36 and a nozzle portion 38. Drive point 36 is a removable or disposable element optionally positioned within injection tip assembly 10 and configured to penetrate surface 13 and subsurface 14 as rod assembly 24 moves generally vertically downwardly into subsurface 14. Drive point 36 includes a head 43 connected to a boss 45. Head 43 includes a smooth conical surface 42 terminating at an apex 44. Apex 44 and conical surface 42 spread subsurface 14 and cooperate to cam sediments and rocks away from injection tip assembly 10 as rod assembly 24 is driven into subsurface 14. A smooth annular surface 46 abuts conical surface 42 and extends around the periphery of head 43. Boss 45 is located proximate annular surface 46 and extends outwardly away from head 43 having generally a smaller cross-sectional profile. Boss 45 defines one or more o-ring grooves 47 extending circumferentially and a corresponding o-ring 49 disposed in the groove so as to establish a fluid seal between the exterior of the drive point 10 and the subsurface 43.

Boss 45 is sized to fit within a pocket 50 defined by a first end 54 of nozzle portion 38. Boss 45 includes a smooth annular surface 48 which abuts a complementary shaped annular surface 52 of nozzle portion 38 when boss 45 is received in pocket 50. Boss 45 fits within pocket 50 to facilitate a one-way connection or one-way engagement between drive point 36 and nozzle portion 38. Pursuant to this one-way engagement, boss 45 remains within pocket 50 when rod assembly 24 moves nozzle portion 38 in a first direction, generally vertically downwardly and into subsurface 14. Conversely, boss 45 slides out of pocket 50 to disengage drive point 36 from nozzle portion 38 when rod assembly 24 moves in a second direction, generally vertically upwardly and out of subsurface 14. As such, in one embodiment of the invention, drive point 36 is a disposable element engaged with nozzle portion 38 during the positioning and placement of rod assembly 24 in subsurface 14. As rod assembly 24 is extracted from subsurface 14, drive point 36 is left behind. In other embodiments of the present invention, drive point 36 is configured to remain with injection tip assembly 10 as rod assembly 24 is extracted from subsurface 14. In another embodiment, the depth of pocket 50 is configured by either the inclusion or omission of segments of probe rod 22 to be substantially longer than the length of boss 45.

Figure 6:
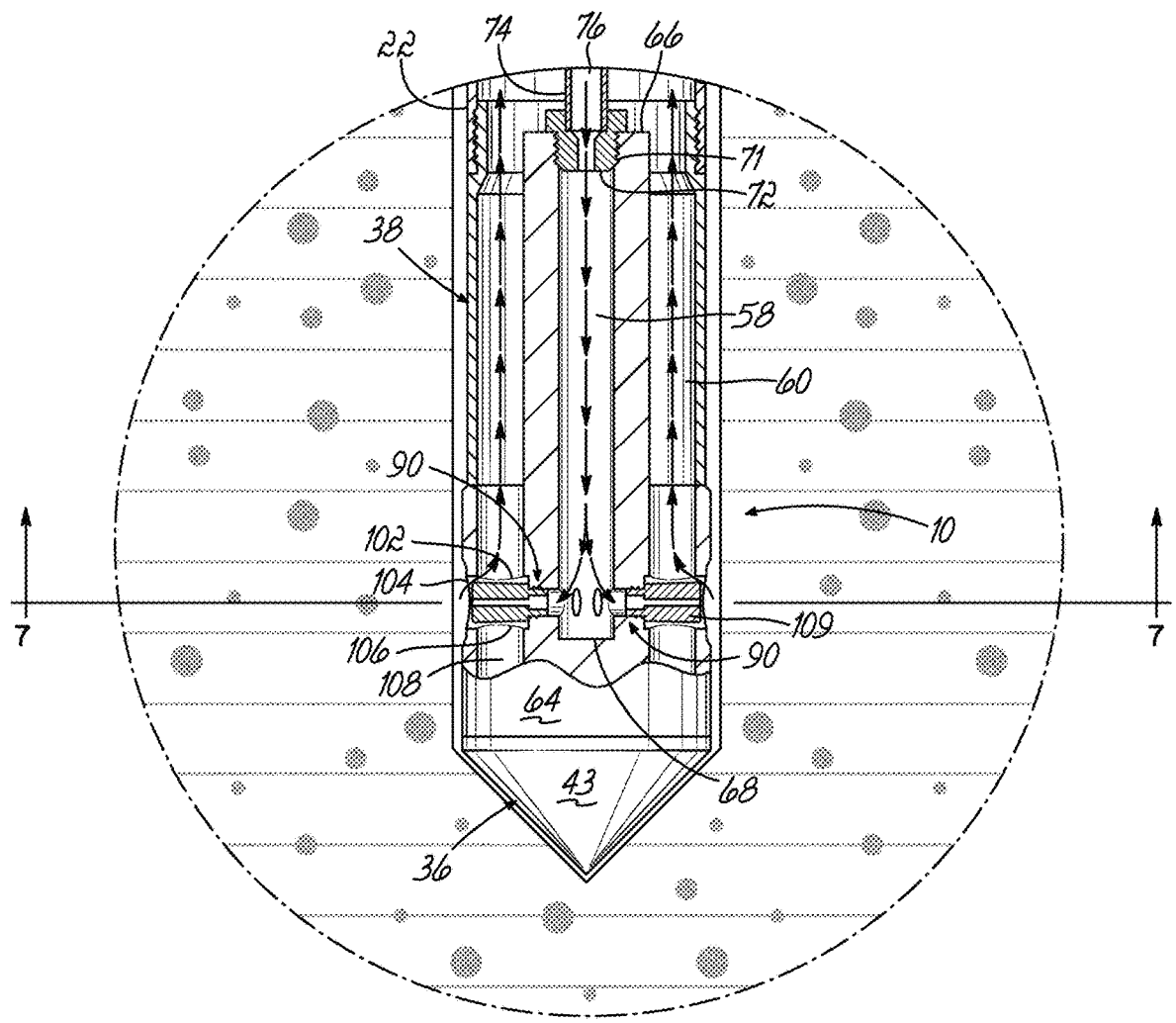
FIG. 6 is a partial cross-sectional view of an injection tip assembly of the present invention disposed in a contaminated subsurface.

Nozzle portion 38 extends from first end 54 to a second end 56 and defines a first channel, referred to hereinafter as an inner channel 58. In this embodiment, inner channel 58 is coaxially oriented with respect to a second channel, referred to hereinafter as an outer channel 60. More specifically, proximate second end 34, inner channel 58 is defined by a cylindrical wall extending outwardly away from a nozzle head 64 to enclose and define inner channel 58. As shown in FIG. 6, inner channel 58 extends from a first end 66 to a second end 68, whereby second end 68 is defined by nozzle head 64. A plurality of threads 70 are disposed proximate first end 66 and are sized to receive a set of complementarily shaped threads 71 disposed on a first end 72 of a hose 74 (FIG. 6) by way of a threaded engagement between threads 70 and threads 71. Hose 74 defines an inner channel 76 which is in fluid communication with inner channel 58 when first end 72 of hose 74 is received by threads 70. Alternatively, inner channel 58 is separated into separate discrete channels extending to a particular element within injection tip assembly 10. For example, inner channel 58 may comprise two separate channels, with each channel extending to a nozzle or an outlet disposed proximate second end 56 of nozzle portion 38. In such an embodiment, separate substances such as liquid or other material are delivered through the separated channels of inner channel 58.

Figure 2:
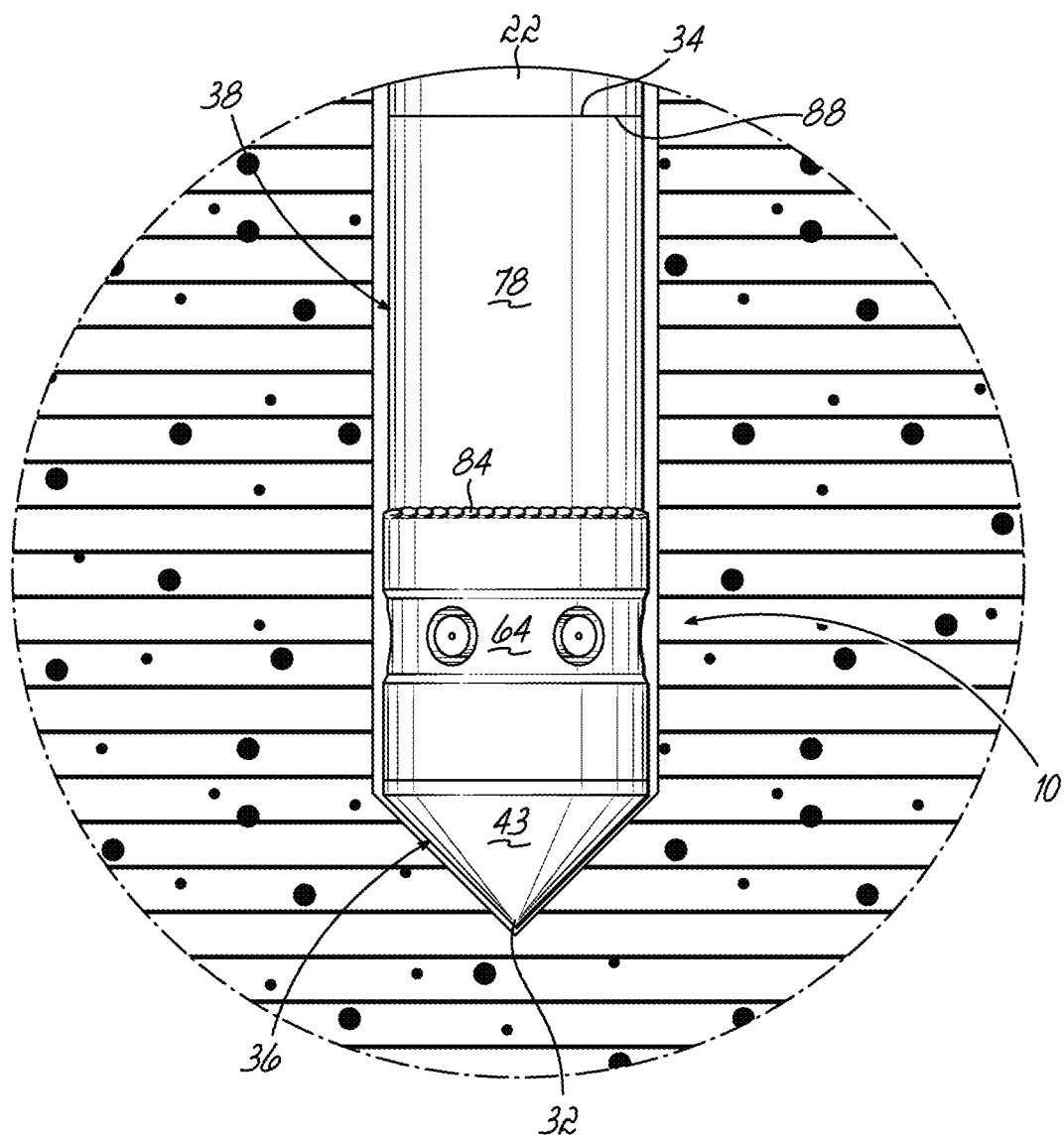
FIG. 2 is an enlarged view of one of the injection tip assemblies of FIG. 1.
Figure 4:
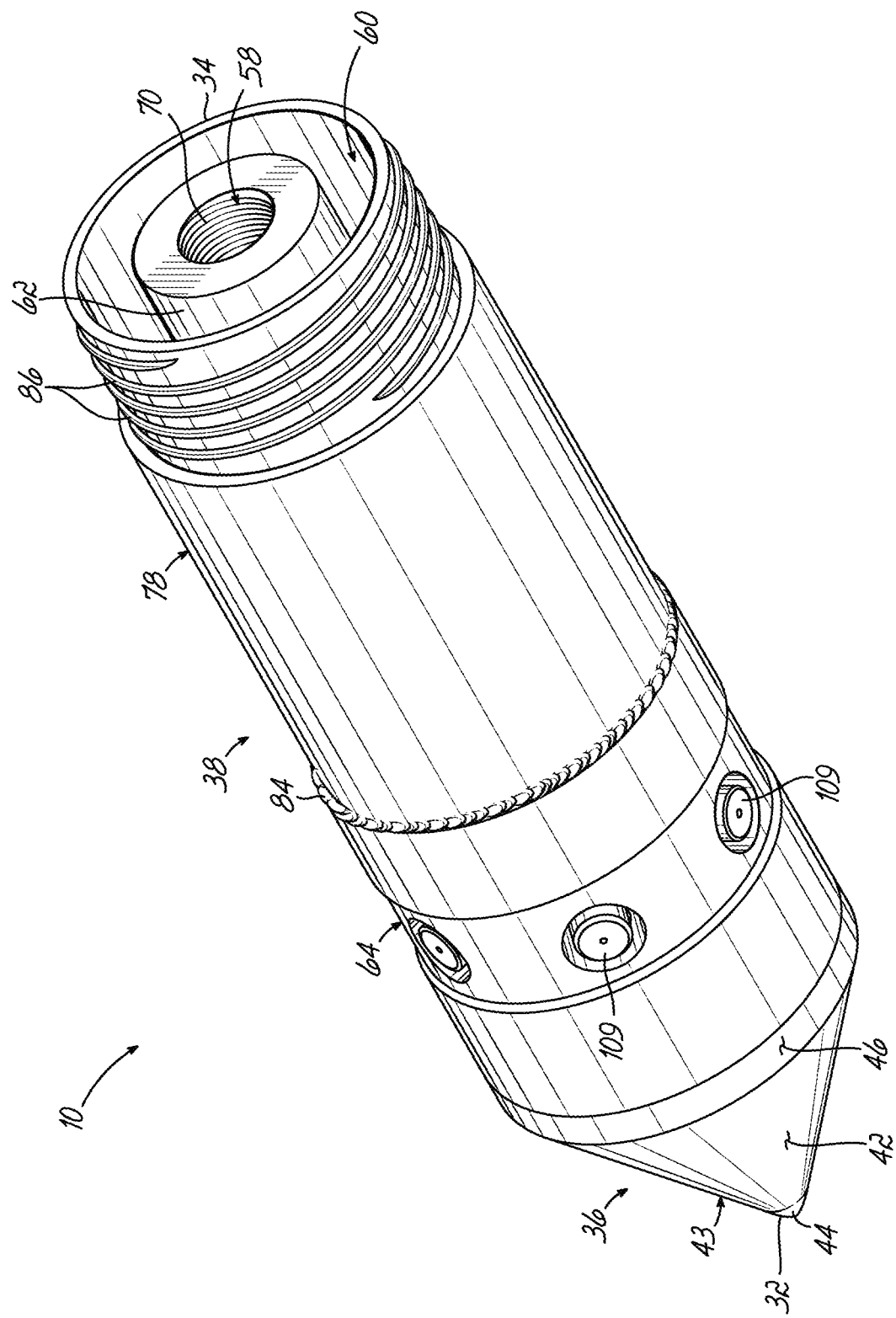
FIG. 4 is a perspective view thereof.
Figure 5:
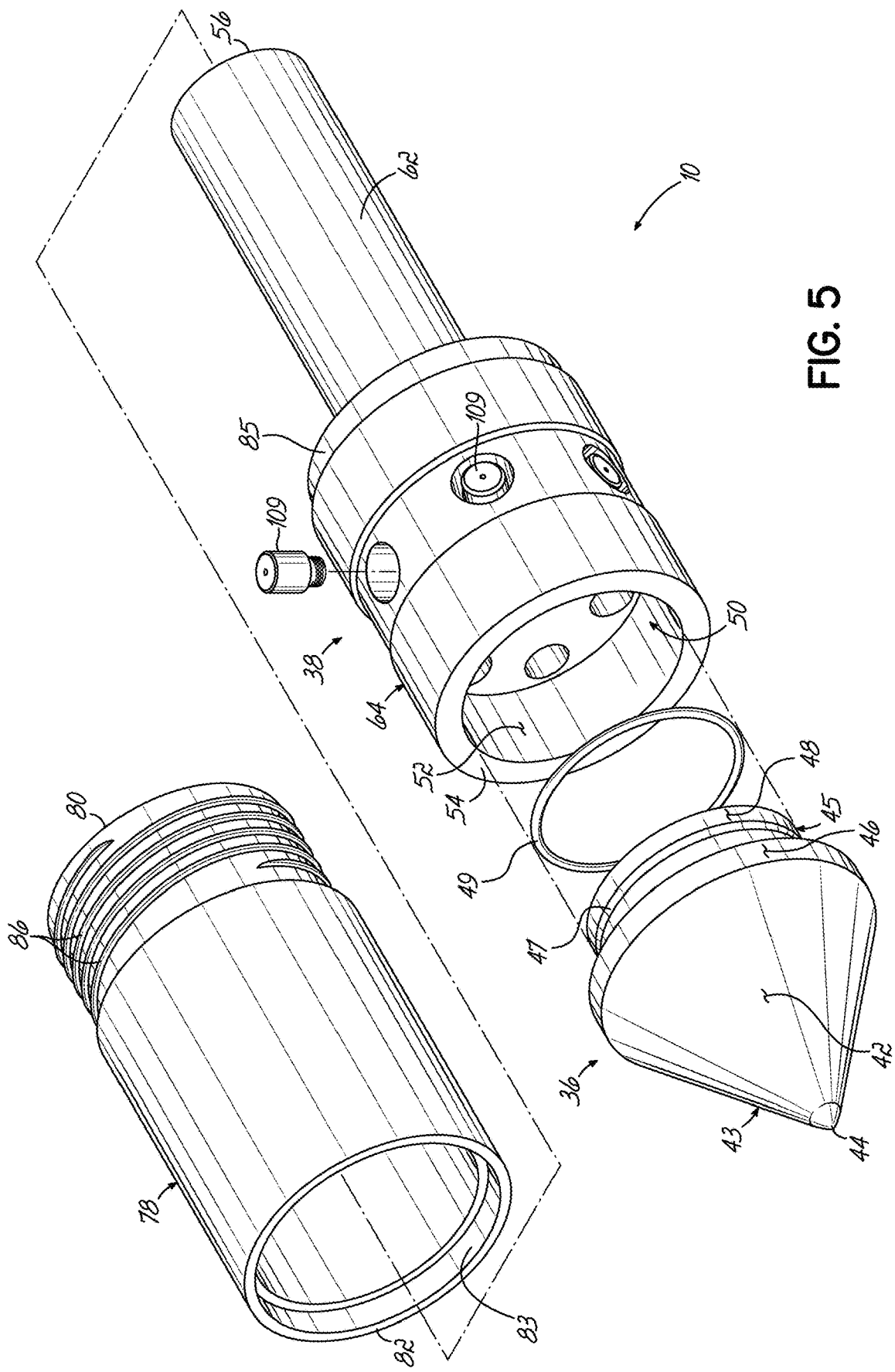
FIG. 5 is an exploded view thereof, showing a sleeve, nozzle plug, and drive point exploded from a nozzle head of the present invention.

As shown in FIGS. 4-6, outer channel 60 is partially defined by a sleeve 78 surrounding cylindrical wall 62. Sleeve 78 extends from a first end 80 to a second end 82 and in the illustrated embodiment of the invention, sleeve 78 is machined independently and welded to nozzle head 64 proximate second end 82 by a series of welds 84 (FIG. 4). Alternatively, or in conjunction with welds 84, second end 82 of sleeve 78 includes a threaded, stepped, or shoulder feature, referred to hereinafter as a shoulder 83, for receiving a complementary feature, referred to hereinafter as a shoulder 85, disposed on nozzle portion 38. In an embodiment of the invention, shoulder 83 of sleeve 78 slidingly engages and receives shoulder 85 of nozzle portion 38 therein to couple sleeve 78 with nozzle portion 38. Welds 84 are thereafter applied, or sleeve 78 and nozzle portion 38 are removably engaged to allow for cleaning or replacement of either portion. First end 80 of sleeve 78 includes a plurality of threads 86 for use in connecting with a first end 88 of probe rod 22, as shown in FIG. 2.

Figure 7:
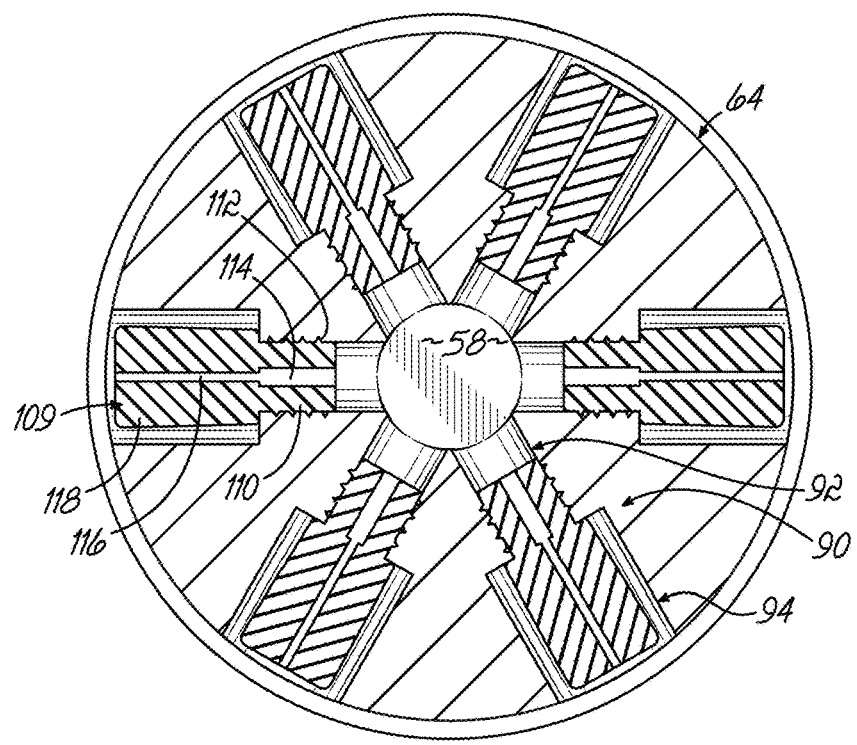
FIG. 7 is a cross-sectional view taken along line 7-7 of FIG. 6.
Figure 8:
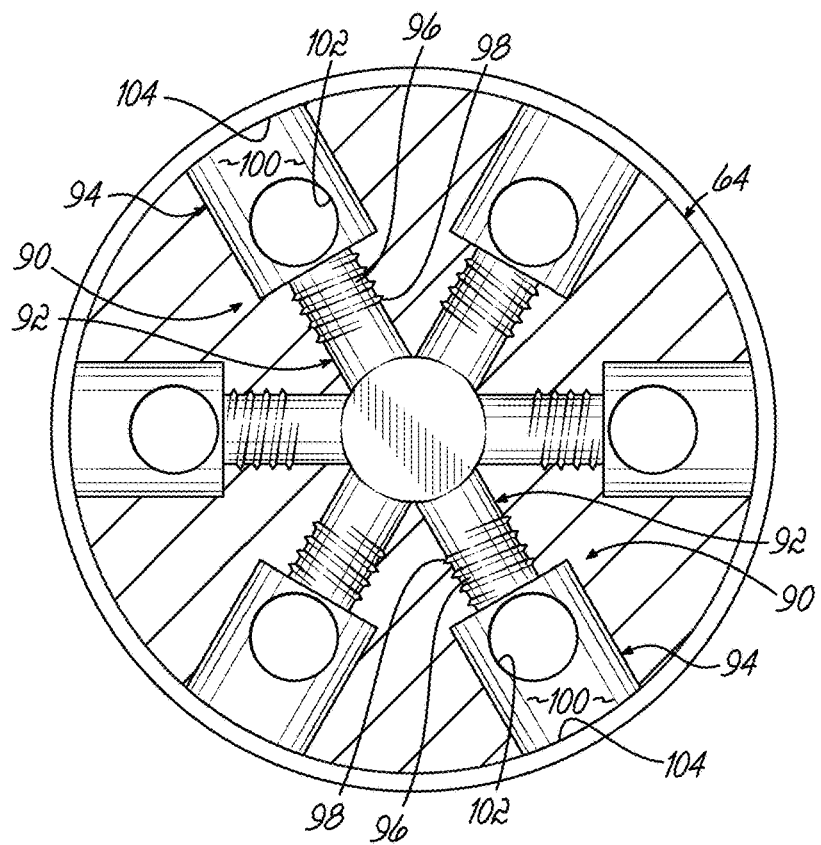
FIG. 8 is a cross-sectional view similar to FIG. 7 and shown with the nozzle plugs removed.

As shown in FIGS. 6-8, both inner channel 58 and outer channel 60 terminate in an outer opening 104 comprising a series of multiple openings defined by nozzle head 64. First end 66 of inner channel 58 spreads into a set of six channels 90 which are oriented generally orthogonally to inner channel 58 and act to alter the general direction of inner channel 58 by approximately ninety degrees in an embodiment of the invention. In another embodiment, the set of six channels 90 is oriented at an angle with respect to inner channel 58 and act to alter the general direction of inner channel 58 by any selected degree. For example, the set of six channels 90 may alter the direction of inner channel 58 by forty-five degrees to present a skirt-like shape of pressurized fluid expelled from injection tip assembly 10. Each channel 90 is defined by a prong 92 of nozzle head 64. In an embodiment of the invention, prong 92 is a distinct element. In another embodiment of the invention, prong 92 is machined as an integral part of nozzle head 64. Prong 92 and each channel 90 terminate at a chamber 94 defined by nozzle head 64. Chamber 94 is generally comprised of two sections, a threaded section 96 defining a series of threads 98 and a fluid exchange section 100 which extends outwardly away from threaded section 96. While the area at the distal end of nozzle head 64 is shown comprising channels 90, prongs 92, chambers 94, and fluid exchange sections 100, any similar orientation or structure for similar or alternative elements is contemplated. For example, rather than distinct channels 90, nozzle head 64 may combine one or more channels 90 into another opening having a different size and shape.

Figure 10:
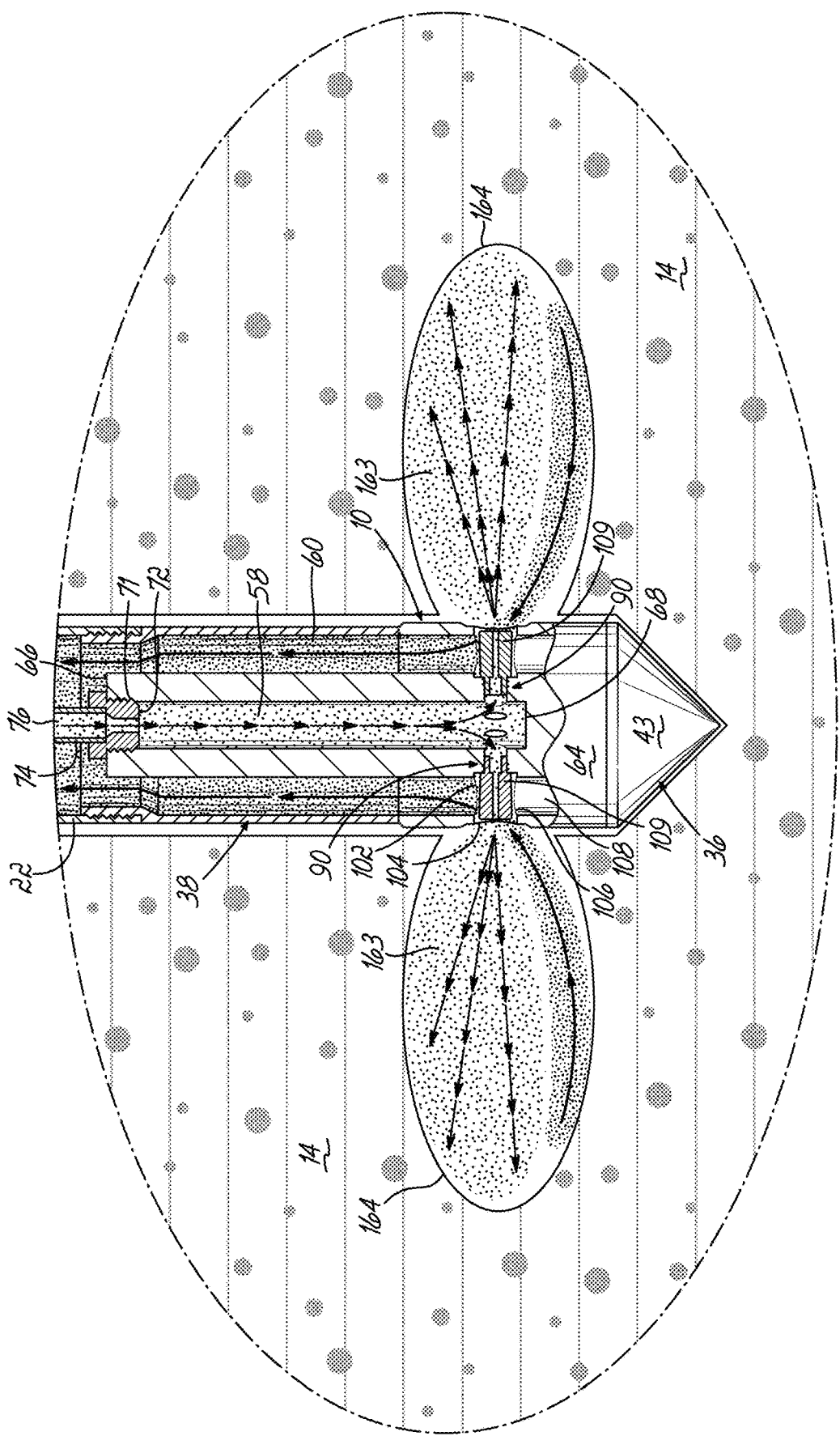
FIG. 10 is a partial cross-sectional view of an injection tip assembly of the present invention shown spraying a pressurized fluid from an inner channel through the nozzle plugs in a generally horizontal orientation and receiving the sprayed pressurized fluid into an outer channel of the injection tip assembly.
Figure 11:
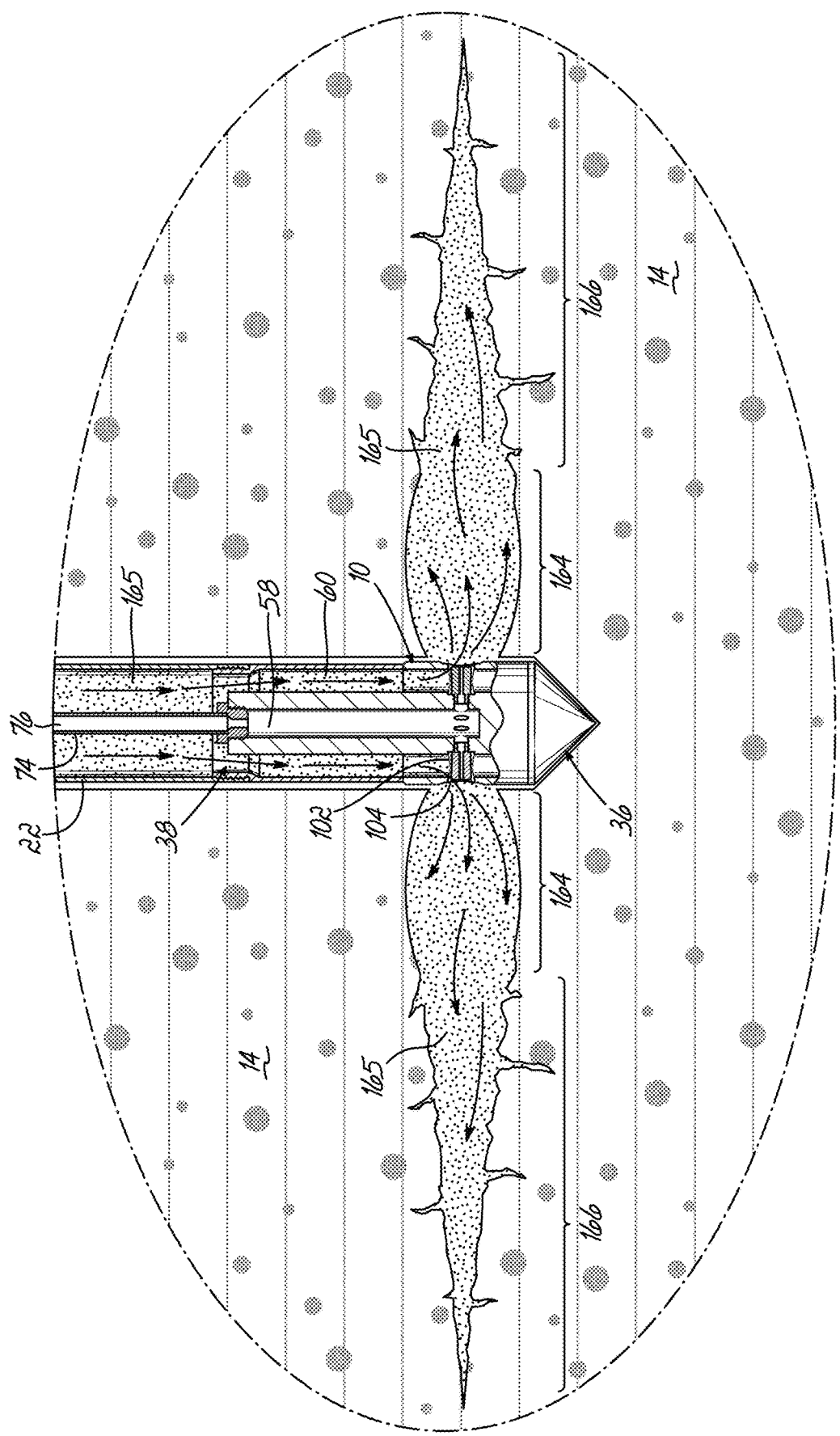
FIG. 11 is a partial cross-sectional view of an injection tip assembly of the present invention shown dispersing a remediation agent out through the outer channel and into an eroded volume to induce hydraulic fracturing.

Fluid exchange section 100 of chamber 94 is in fluid communication with outer channel 60 by way of a top opening 102 which is defined by nozzle head 64 and allows fluid flow between outer channel 60 and fluid exchange section 100. Fluid exchange section 100 is also in fluid communication with the exterior of injection tip assembly 10 by way of outer opening 104 which is defined by nozzle head 64. Further, fluid exchange section 100 is also in fluid communication with pocket 50 by way of a bottom opening 106 which is disposed on one end of a lower channel 108 defined by nozzle head 64. Lower channel 108 extends from fluid exchange section 100 to pocket 50. Thus, as shown in FIG. 11 and discussed in greater detail below, fluid flows out of outer channel 60 by passing fluid through top opening 102 and into fluid exchange section 100 and out of nozzle portion 38 by way of outer opening 104 and bottom opening 106. Conversely, as shown in FIG. 10 and discussed in greater detail below, fluid is received into outer channel 60 in a reverse process, whereby fluid enters outer opening 104 and/or bottom opening 106 and passes through fluid exchange section 100 and into outer channel 60 to be collected by the fluid control system.

Each chamber 94 is sized to selectively receive a disposable or removable nozzle plug 109 which facilitates dispersion of fluid into the subsurface. Each nozzle plug 109 includes a threaded portion 110 having a plurality of threads 112 disposed thereon. Threaded portion 110 is configured to be removably secured and threadably received by threaded section 96 of each chamber 94 whereby threads 98 of threaded section 96 threadably engage threads 112 of threaded portion 110 such that post 92 abuts threaded section 110. Threaded section 110 further defines an inlet 114. Inlet 114 is formed and oriented within threaded portion 110 to align with channel 90 of post 92 when nozzle plug 109 is disposed in chamber 94, thereby enabling fluid communication between inlet 114 and channel 90. Inlet 114 converges into an outlet 116 defined by a plug head 118, whereby plug head 118 extends from threaded portion 110. As such, outlet 116 is in fluid communication with inner channel 58 by way of channel 90 and inlet 114. The convergence of inlet 114 into outlet 116 creates a pressurized spray as the fluid moves from inner channel 58 to channel 90 to inlet 114 and finally exits injection tip assembly 10 by way of outlet 116.

Figure 3:
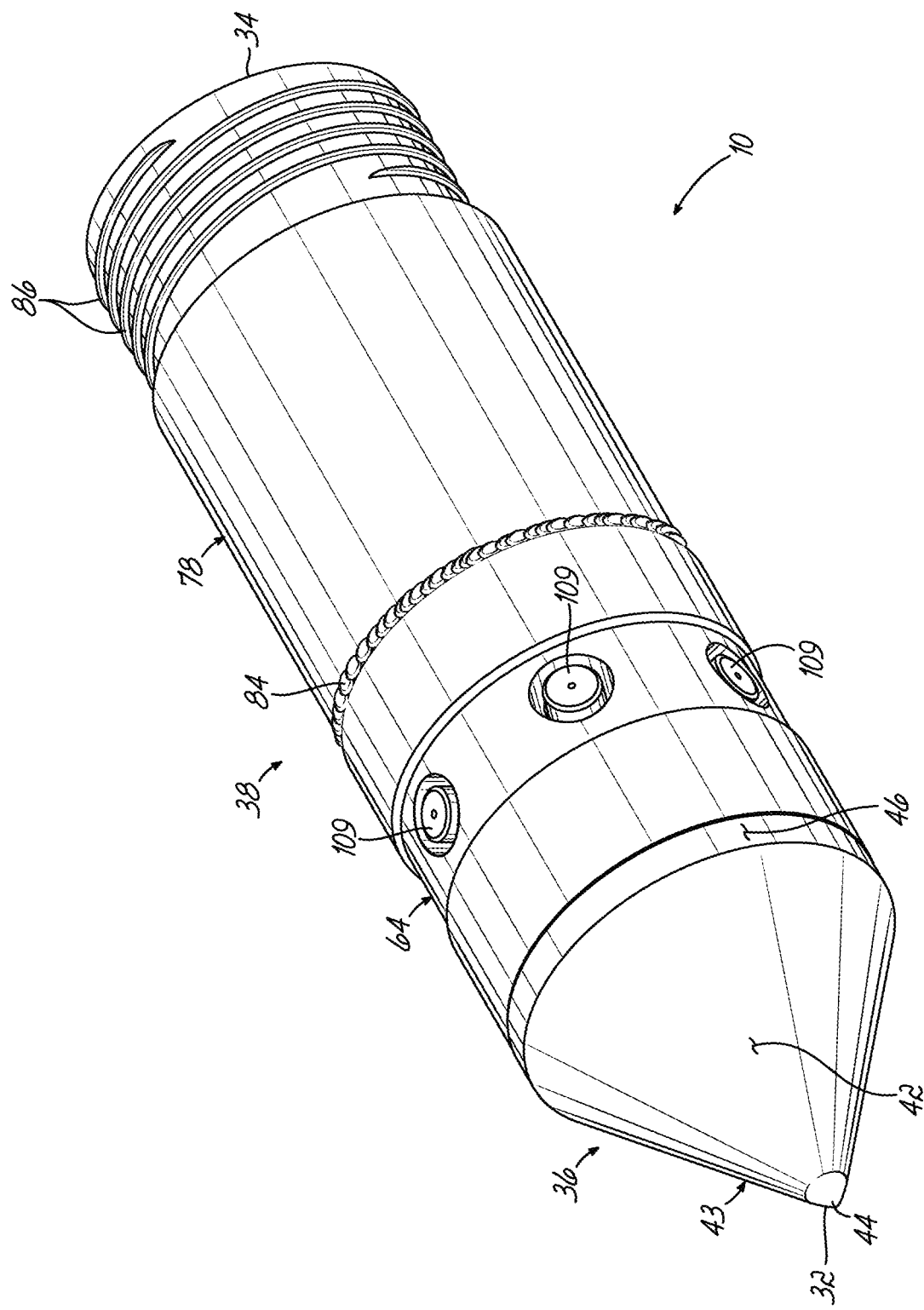
FIG. 3 is a perspective view of an injection tip assembly of the present invention.

As shown in FIGS. 3 and 5, the cross-sectional area of plug head 118 is smaller than the cross-sectional area of fluid exchange section 100 of chamber 94. The relative size of plug head 118 with respect to fluid exchange section 100 defines a space therebetween for allowing fluid to move around nozzle plug 109 and enter or exit top opening 102 or bottom opening 106.

Figure 21A:
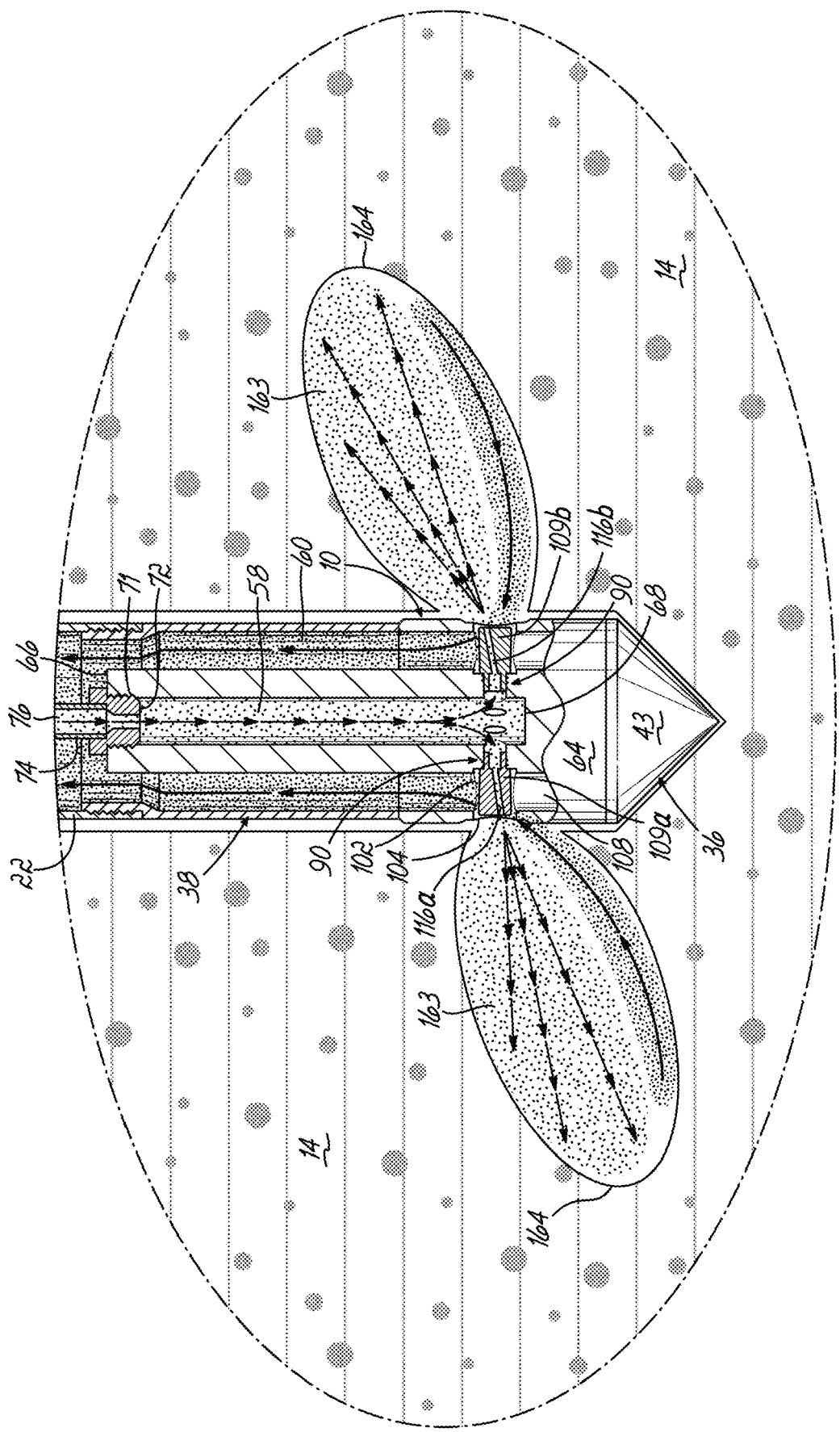
FIG. 21a is a partial cross-sectional view of an injection tip assembly of the present invention shown spraying a pressurized fluid from an angled inner channel of the nozzle plugs in a generally non-horizontal orientation and receiving the sprayed pressurized fluid into an outer channel of the injection tip assembly.

If the user desires a certain spray angle or orientation of the fluid into the subsurface, the user may select and secure nozzle plugs 109 to fit the desired requirements. Nozzle plugs 109 may be selected based on different spray characteristics and are interchangeable and configurable by the user. For example, as shown in FIG. 10, nozzle plugs 109 are selected and configured to spray in a conical or fan-shaped pattern. Alternatively, nozzle plugs 109 are selected and configured to spray generally parallel to its axis. As another example, as shown in FIG. 21a, nozzle plug 109a includes an angled channel 116a that provides a spray characteristic which disperses fluid in a downward lobe orientation while nozzle plug 109a is secured to the nozzle head 64 in a generally orthogonal direction. Similarly, nozzle plug 109b includes an angled channel 116b that provides a spray characteristic which disperses fluid in an upward lobe orientation while nozzle plug 109b is secured to nozzle head 64 in a generally orthogonal direction.

Figure 21B:
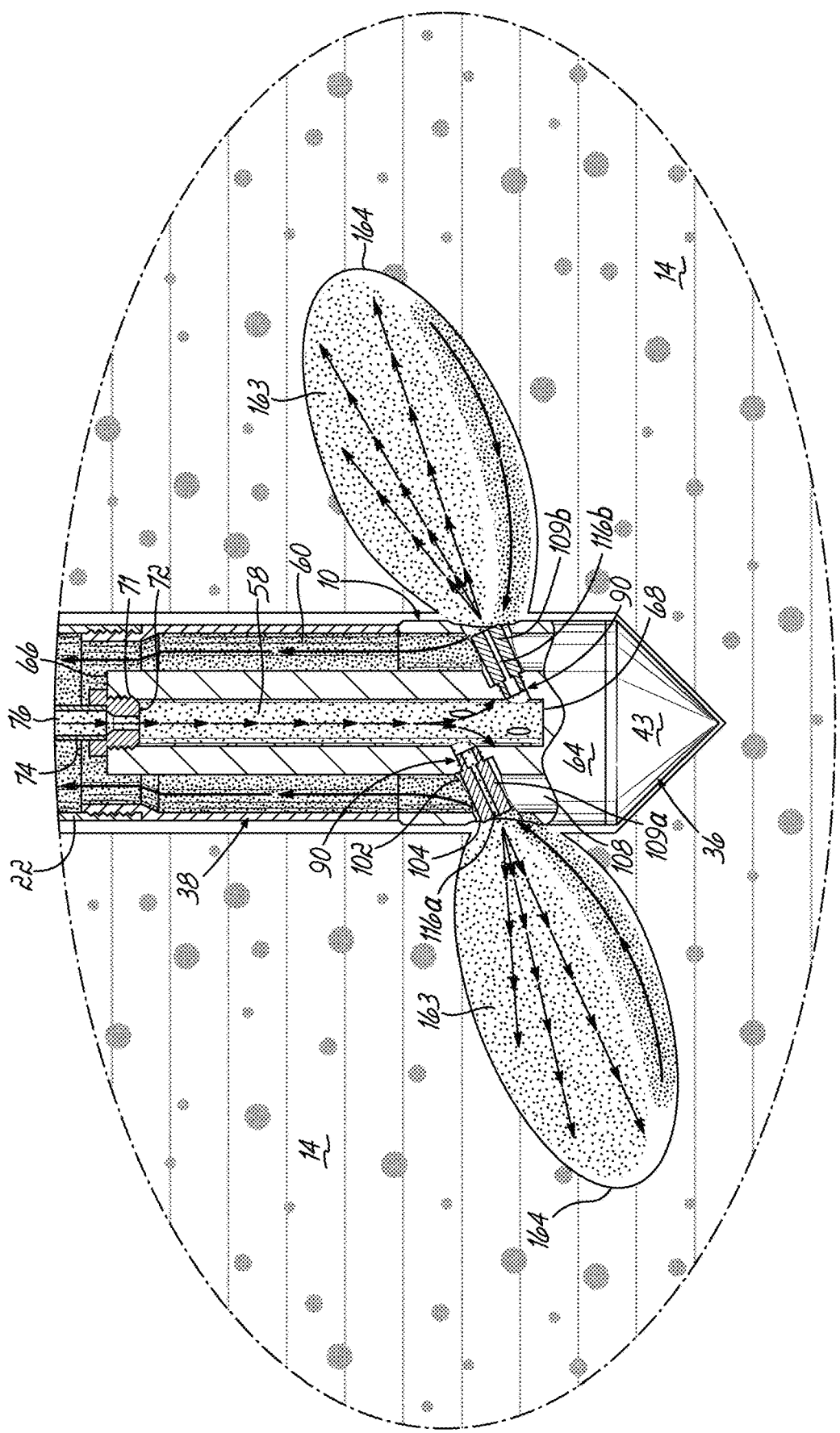
FIG. 21b is a partial cross-sectional view, similar to FIG. 21a, of an injection tip assembly of the present invention shown spraying a pressurized fluid from an inner channel through angled nozzle plugs in a generally non-horizontal orientation and receiving the sprayed pressurized fluid into an outer channel of the injection tip assembly.

In another example, as shown in FIG. 21b, nozzle plugs 109a and 109b include a standard non-angled channel 116a and 116b, respectively, but are secured to the nozzle head 64 in an angled orientation to disperse fluid in a downward lobe orientation and an upward lobe orientation, respectively. This allows a user to select standard nozzle plugs 109 and connect the nozzle plugs 109 to the nozzle head 64 in an angled manner, as the nozzle head 64 includes an angled nozzle plug 109 receiving structure.

Figure 9:
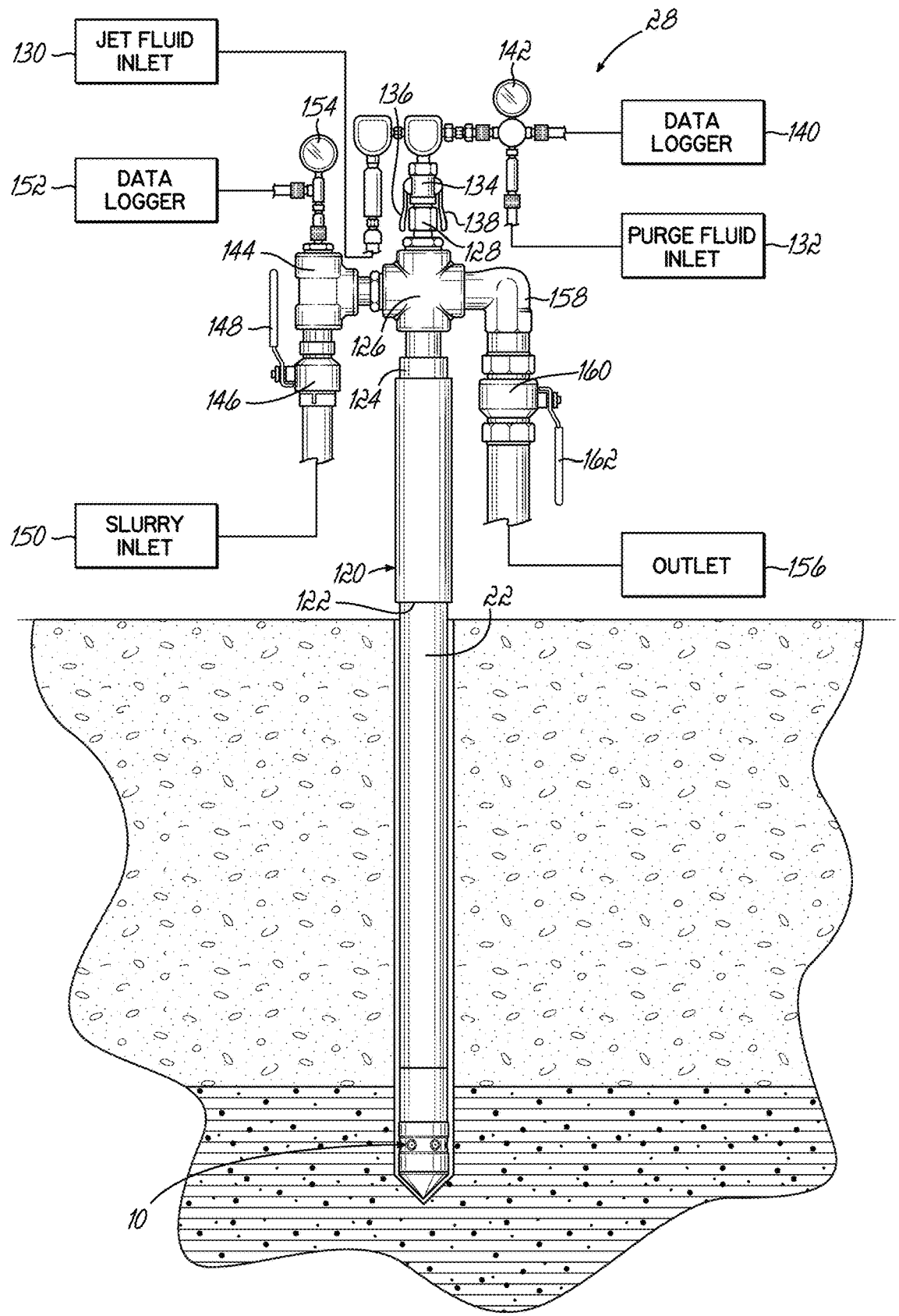
FIG. 9 is an elevational view of an injection tip assembly of the present invention connected to a series of probe rods and with a well head disposed on the outermost probe rod.

As shown in FIGS. 1 and 9, after insertion of rod assembly 24 into subsurface 14, the uppermost probe rod 22 extending out of surface 13 is capped with well head 28. Well head 28 selectively provides substances to injection tip assembly 10 via probe rods 22. Well head 28 includes a connector segment 120 which is selectively connected to probe rod 22 at a first end 122 and connected to a splitter 126 at a second end 124. Splitter 126 receives substances such as fluid from various sources and transfers the fluid as required therethrough. Splitter 126 also admits and coaxially secures a jet fluid inlet 130, which connects to hose or hoses 74 thereby delivering fluid to passage or passages 58. Splitter 126 receives fluid from a segment 128 of a seal assembly 134 which supplies fluid from either jet fluid inlet 130 or a purge fluid inlet 132. Seal assembly 134 mounted on splitter 126 maintains fluid pressure within splitter 126. Jet fluid inlet 130 and purge fluid inlet 132 are in fluid communication with seal assembly 134 which is operatively connected to a first handle 136 and a second handle 138. The orientations of first handle 136 and second handle 138 determine whether seal assembly 134 is properly clamped down upon segment 128 to provides fluid through splitter 126 to segment 120. For example, in a particular orientation of first handle 136 and second handle 138, seal assembly 134 is fittingly secured to segment 128. In another orientation of first handle 136 and second handle 138 allows seal assembly 134 to move about segment 128.

Segment 120 is connected to hose 74 by way of splitter 126 and segment 128. Thus, when fluid is supplied to segment 128 by either jet fluid inlet 130 or purge fluid inlet 132, the fluid travels through splitter 126 and segment 120 and into hose 74 inside rod assembly 24. As such, the fluid from either jet fluid inlet 130 or purge fluid inlet 132 is directed into inner channel 58 of injection tip assembly 10 by way of rod assembly 24. To log data and monitor pressure within inner channel 58, a data logger device 140 is provided and operatively connected to segment 128 to obtain data, which can be recorded as part of a permanent record and/or displayed remotely or locally, from well head 28 and rod assembly 24. Similarly, a pressure gauge 142 is operatively connected to segment 128 to provide visual feedback information to a user regarding the pressure within segment 128.

Splitter 126 also receives fluid from a segment 144 which is connected to a valve 146 which is operatively opened and closed by actuation of a valve handle 148 connected thereto. Valve 148 receives fluid from a slurry inlet 150. Slurry inlet 150 provides slurry fluid to valve 148 which allows the slurry fluid to pass into segment 144 when valve handle 148 is in a particular orientation and prevents slurry fluid from passing into segment 144 when in a different orientation. Slurry inlet 150 is connected to outer channel 60 by way of segment 144, splitter 126, and segment 128. Thus, when slurry fluid is supplied to segment 144, the slurry fluid travels through splitter 126 and segment 120 and into outer channel 60. As such, the slurry fluid from slurry inlet 150 is directed into outer channel 60 of injection tip assembly 10 by way of rod assembly 24. To log data and monitor pressure within outer channel 60, a data logger device 152 is provided and operatively connected to segment 144 to obtain data, which can be recorded as part of a permanent record and/or displayed remotely or locally, from well head 28 and rod assembly 24. Similarly, a pressure gauge 154 is operatively connected to segment 144 to provide visual feedback information to a user regarding the pressure within segment 144.

Inasmuch as waste fluid travels out of injection tip assembly 10 and up through rod assembly 24, splitter 126 receives waste fluid from outer channel 60 by way of segment 120. This waste fluid is purged from well head 28 through outlet 156 by way of a segment 158 connected to splitter 126. A valve 160 is disposed between segment 158 and outlet 156 which opens and closes to allow waste fluid to travel therethrough. A valve handle 162 is operatively connected to valve 160 to allow a user to manually open and close valve 160. Valve handle 162 adjusts the volume of waste fluid passing through valve 160 to configure and affect the pressure in outer channel 60 and subsurface 14 proximate injection tip assembly 10. In an embodiment of the invention, outlet 156 passes the waste fluid to a reservoir (not shown) to be collected for disposal or remediation. Alternatively, outlet 156 is selectively coupled back to jet fluid inlet 130, purge fluid inlet 132, or both, to allow recirculation of the waste fluid back into the fluid control system, shown in FIG. 9 as well head 28, for further use.

In operation, injection tip assembly 10 is used to deliver remediation materials into contaminated area 20. Initially, a user attaches injection tip assembly 10 to a probe rod 22 and positions injection tip assembly 10 of probe rod 22 such that drive point 36 is directed toward first layer 16 of subsurface 14 at surface 13. First end 72 of hose 74 is connected to inner channel 76 and extends entirely into well head 28 or added in segments along with each new segment of probe rod 22. As shown in FIG. 1, ramming machine 26 thereafter imparts a ramming motion to probe rod 22 to drive probe rod 22 and injection tip assembly 10 into first layer 16 of subsurface 14. This ramming continues until either the original probe rod 22 is almost entirely within subsurface 14 or injection tip assembly 10 is at the desired depth within subsurface 14. Probe rods 22 and any accompanying segments of hose 74 are added as needed to each successive end of the previous probe rod 22 to form the overall rod assembly 24 penetrating into subsurface 14.

As shown in FIGS. 1 and 9, after injection tip assembly 10 disposed on rod assembly 24 is at a sufficient depth within subsurface 14, ramming machine 26 is removed from rod assembly 24 and a fluid control system, such as well head 28 and control device 30, is attached to the probe rod 22 extending outwardly from subsurface 14 at surface 13.

Well head 28 is then connected to fluid device 30 using various hoses and interconnections as desired by the user. Particularly, jet fluid inlet 130 is connected to a source of a substance, such as a pressurized fluid or pressurized water 163 (FIG. 10). Purge fluid inlet 132 is also connected to a substance supply such as a water supply, having much less pressure applied thereto. As such, purge fluid inlet 132 and the associated fluid is used to flush any debris away from nozzle head 64 which has accumulated during the ramming process in penetration of subsurface 14. Slurry inlet 150 is connected to a supply of substance such as a slurry fluid which may be a remediation agent 165 for use in remediating contaminated area 20 or may be any other slurry or substance as desired. Outlet 156 is connected to an outlet hose which receives expelled fluid from well head 28 and conveys this fluid to fluid device 30.

After injection tip assembly 10 is positioned within contaminated area 20 and well head 28 is connected to the upper most probe rod 22 and all interconnected hoses are sufficiently supplied with fluid by fluid device 30, a user manually actuates well head 28 to observe and control the delivery process. As such, a user approaches well head 28 and actuates valve handle 162 to open valve 160 and further actuates valve handle 148 to close valve 146. The user then calls for activation of the supply of purge fluid provided at inlet 132. The fluid from purge inlet 132 thereby expels any contaminates or debris which may be clogging or plugging any part of nozzle head 64. Expelled material exits from outlet 156. The user then calls for the activation of the supply of jet fluid provided at inlet 130.

As shown in FIGS. 9 and 10, jet fluid inlet 130 provides pressurized water 163 into inner channel 58 by way of hoses 74 connected in succession along rod assembly 24 and extending from cylindrical wall 62 of injection tip assembly 10 to well head 28. Thus, jet fluid inlet 130 is in fluid communication with inner channel 58 of nozzle head 64 by way of hoses 74 disposed inside each probe rod 22 along the length of rod assembly 24. A compass (not shown) or another marking system may be implemented in the injection tip assembly 10 for use in illustrating to the user above the subsurface how the nozzle portion 38 is oriented within the subsurface. For example, a notch or marking may be provided in each probe rod 22 with the upper most final probe rod 22 illustrating to the user how the nozzle portion 38 is oriented in the subsurface.

As shown in FIG. 10, as pressurized fluid travels down inner channel 58, this pressurized fluid enters the various inlets 114 of nozzle plugs 109 and is expelled at high velocity in a spray pattern through the associated outlets 116 of nozzle plugs 109. The spray of the accelerated fluid erodes subsurface 14 into a cavity having a particular pattern, shape, or volume, as dictated by the shape and orientation of nozzle plug 109. As shown in FIG. 10, the pressurized fluid sprays outwardly away from nozzle head 64 eroding subsurface 14 and thereafter entering outer channel 60 by way of outer opening 104 and top opening 102. Thus, the accelerated fluid travels down inner channel 58 and out nozzle plugs 109 and is thereafter collected and received within fluid exchange section 100 and travels back up injection tip assembly 10 by way of outer channel 60. As shown in FIG. 11, once an eroded volume 164 or cavity is sufficiently constructed, the user, by observation of pressure gauge 154, actuates valve handle 162 to close valve 160 to a degree that restricts returning flow and allows pressure to accumulate to a desired magnitude within outer channel 60, top opening 102, fluid exchange section 100, and outer opening 104, whereby pressure is exerted upon the faces of eroded volume 164, causing a hydraulic fracture to nucleate at that moment and no earlier. For example, if a user wishes to maintain the general pressure within outer channel 60 and eroded volume 164 of 50 pounds per square inch (PSI), the user observes pressure gauge 154 and notes that the pressure within outer channel 60 and eroded volume 164 is greater than 50 PSI. In this instance, the user opens valve 160 by way of valve handle 162 slowly to allow fluid to escape through valve 160 into outlet 156 and bring the pressure down toward 50 PSI. Conversely, if a user observes a pressure lower than 50 PSI, the user actuates valve handle 162 to close valve 160 to a certain degree to allow the pressure within outer channel 60 and eroded volume 164 to increase toward the desired 50 PSI. As such, a user has pressure feedback at well head 28 as well as a mechanism for controlling and configuring pressure within outer channel 60 and eroded volume 164. The ability to control pressure within outer channel 60 and eroded volume 164 allows the user to fine tune the nucleation and propagation of a hydraulic fracture as desired.

Another method for nucleating and propagating a hydraulic fracture in a controlled manner involves dispensing a substance through the injection tip assembly 10 at a first rate, monitoring the pressure in the cavity or eroded volume 164, and adjusting the first rate to a second rate to change the pressure in the cavity or eroded volume 164 to nucleate and propagate the fracture. Another method for nucleating and propagating a hydraulic fracture in a controlled manner involves collecting a substance through the injection tip assembly 10 at a first rate, monitoring the pressure in the cavity or eroded volume 164, and adjusting the first rate to a second rate to change the pressure in the cavity or eroded volume 164 to nucleate and propagate the fracture. Yet another method for nucleating and propagating a hydraulic fracture in a controlled manner involves monitoring the pressure in the cavity or eroded volume 164 and adjusting both the substance dispensing rate and the substance collecting rate to alter the pressure to nucleate and propagate the fracture. In another embodiment of the invention, the nozzle head 64 may be fabricated such that the inherent rate by which a substance is dispensed through the nozzle head 64 generates the corresponding desired pressure in the cavity to nucleate and propagate a hydraulic fracture. In this embodiment, the hydraulic fracture is nucleated with minimal or no direct control of the pressure in the cavity by a user.

As shown in FIG. 11, once eroded volume 164 is sufficiently constructed and a fracture has been nucleated, the user calls for activation of the supply of slurry that is provided at inlet 150 and actuates valve handle 148 to open valve 146 and allow remediation agent 165 supplied by slurry inlet 150 to pass thereby. Remediation agent 165 enters outer channel 60 by way of probe rods 22 and travels downwardly through rod assembly 24 and into nozzle head 64 by way of outer channel 60. Remediation agent 165 is thereafter expelled from nozzle head 64 by way of top opening 102 and outer opening 104 and is expelled from fluid exchange section 100 into eroded volume 164. The user may also use the dispelling of the remediation agent 165 as the mechanism for nucleating and propagating the fracture in a controlled manner.

Observing pressure gauge 154 and actuating valve handle 162, the user may allow the pressure to build within eroded volume 164 such that hydraulic fracturing occurs in a controlled manner. As shown in FIG. 11, hydraulic fracturing occurs in a fractured area 166 outwardly away from nozzle head 64 in a generally horizontal manner within subsurface 14. This allows remediation agent 165 to travel and be applied in a generally horizontal plane within eroded volume 164 and fractured area 166 of contaminated area 20 which may have particularly efficient remediation effects on contaminated area 20.

Figure 12:
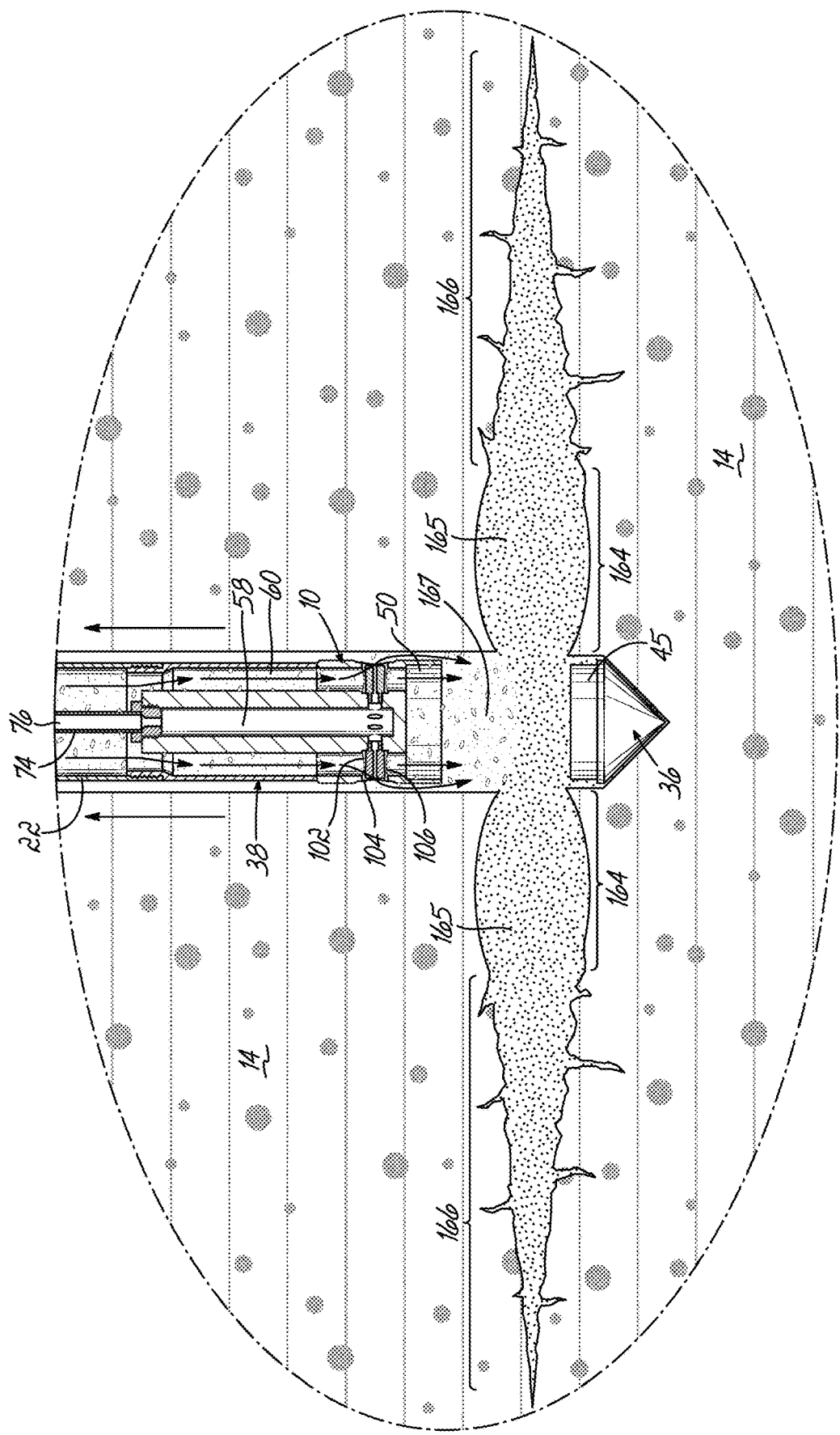
FIG. 12 is a partial cross-sectional view of an injection tip assembly of the present invention shown dispersing a concrete material through the center channel and into the bore hole as the injection tip assembly is moved from the bore hole.

As shown in FIG. 12, after remediation agent 165 is applied to eroded volume 164 and hydraulic fracturing has occurred as desired and controlled by the user, rod assembly 24 is pushed inwardly to address targeted intervals at greater depth, or pulled outwardly away from the remediated area once the remediation is completed. If the user wishes to use rod assembly 24 to fill the bore hole created by rod assembly 24, the user disconnects the hose supplying remediation agent 165 from slurry inlet 150 and connects a new hose supplying a bore hole filling material, for example a cementitious grout 167. The user opens valve 146 by way of valve handle 148 and closes valve 160 by way of valve handle 162 to allow grout 167 to enter outer channel 60 and to travel down outer channel 60 and out top opening 102 and outer opening 104 into the bore hole as rod assembly 24 is extracted from subsurface 14. In as much as boss 45 of drive point 36 is seated within pocket 50 of nozzle portion 38, when rod assembly 24 is extracted from subsurface 14, drive point 36 remains behind within the bore hole as boss 45 slides out of pocket 50. With the removal of drive point 36 from nozzle portion 38, bottom openings 106 are exposed to the bore hole as rod assembly 24 is extracted from subsurface 14. This allows for cementitious grout 167 to also be expelled from outer channel 60 by way of bottom openings 106 and efficiently fill the bore hole as rod assembly 24 is extracted. Cementitious grout 167 may be applied during the entire extraction of rod assembly 24 to entirely fill the bore hole and seal remediation agent 165 within eroded volume 164 and fractured area 166. Once the bore hole is filled with cementitious grout 167, injection tip assembly 10 is removed from probe rods 22 and nozzle plugs 109 are inspected for damage and selectively replaced as desired.

As shown in FIGS. 1-12, injection tip assembly 10 further includes an ornamental design. An ornamental design also shown in FIGS. 13-16. An ornamental design is also shown in FIGS. 17-20 with a set of openings and threads shown in phantom.

Alternative embodiments of this invention may incorporate nozzle plug 109 or another style of nozzle with openings in a vertical plane, which is in contrast to the horizontal plane suggested by FIGS. 2-12, or may utilize nozzle plugs 109 mounted at various other angles to the axes of the device, in which cases the resulting hydraulic fractures will nucleate and propagate with dip angles other than horizontal as desired by the user. Furthermore, the device may be assembled from its several parts using methods that either permanently join the parts or removably secure the parts.

As shown in FIG. 21a, nozzle plug 109a is provided with an angled or non-horizontal outlet 116a, whereby the orientation of outlet 116a acts to spray water 163 in a downward direction relative to injection tip assembly 10. In this embodiment, eroded volume 164 is embodied in a downward lobe due to the orientation of outlet 116a of nozzle plug 109a. Similarly, nozzle plug 109b is provided with an upwardly angled outlet 116b, whereby the orientation of outlet 116b acts to spray water 163 in an upward direction relative to injection tip assembly 10. In this embodiment, eroded volume 164 is embodied in an upward lobe due to the orientation of outlet 116b of nozzle plug 109b.

In another embodiment of nozzle head 64, as shown in FIG. 21b, each nozzle plug 109a and 109b includes a non-angled or generally horizontal outlet 116a and 116b, respectively. However, each nozzle plug 109a and 109b is connected to nozzle head 64 at a non-horizontal angle relative to injection tip assembly 10, whereby the spray of pressurized fluid is expelled at a downward direction for nozzle plug 109a and an upward direction for nozzle plug 109b. The angling of the nozzle plug receiving area within nozzle head 64 may be accomplished by altering the direction of one or more of the various elements within nozzle head 64 responsible for controlling the flow of the pressurized fluid from inner channel 58 to the exterior of nozzle head 64. For example, channels 90, prongs 92, chambers 94, threaded section 96, fluid exchange section 100, or a combination thereof, may be altered or configured to orient the corresponding nozzle plug 109 in a particular direction and thus alter the direction of the flow of fluid therefrom. In this embodiment of the invention, multiple nozzle heads 64 are available for selection by the user, with each nozzle head 64 having prior an orientation of a nozzle plug receiving area defined by the nozzle head in a different orientation. Thus, prior to connecting the nozzle plug 109 to the nozzle head 64, the user selects a particular nozzle head 64 based at least in part on an orientation of a nozzle plug receiving area defined by the nozzle head 64.

Figure 22:
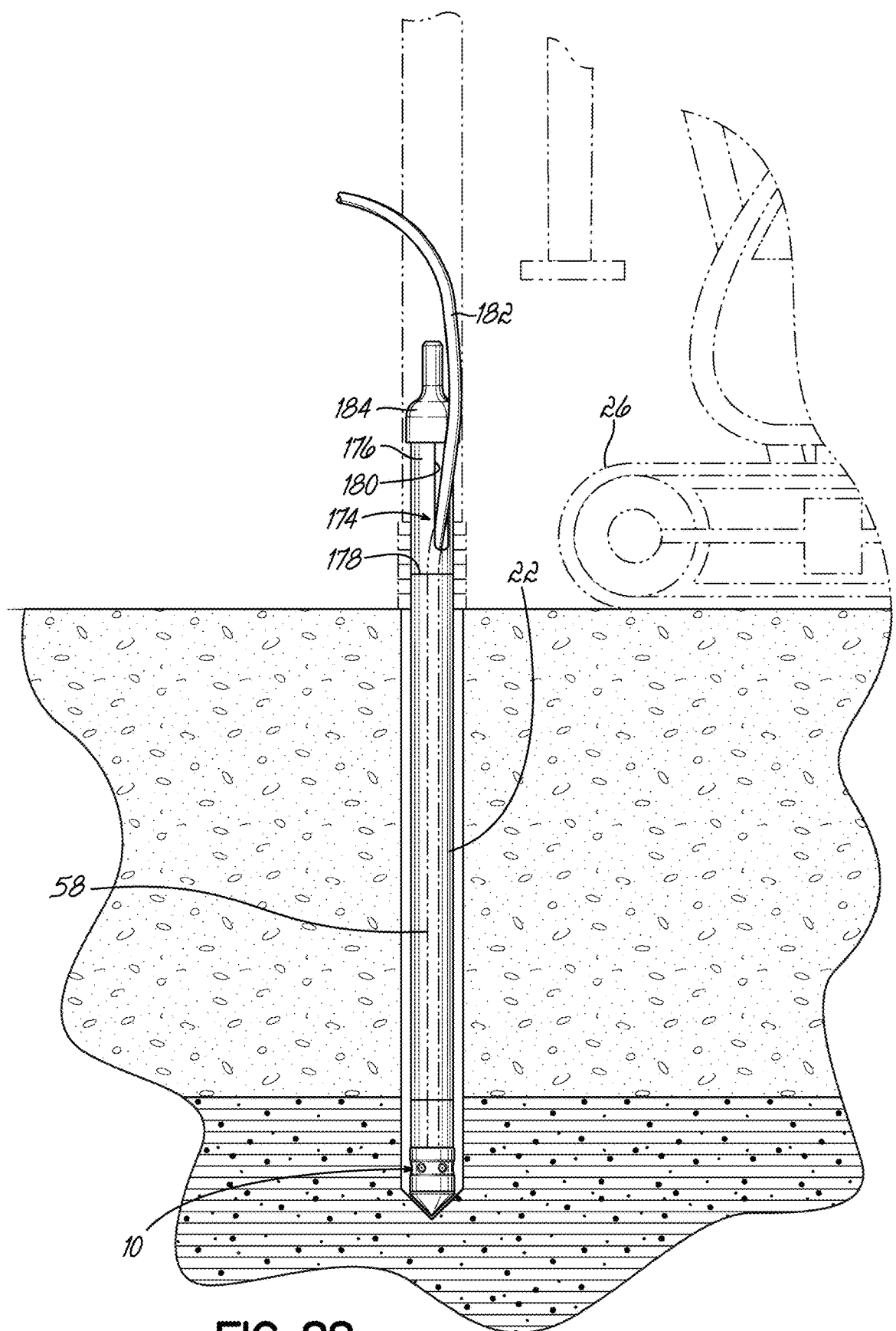
FIG. 22 is a partial cross-sectional view of a rod assembly of the present invention shown with a slotted probe rod and purge tubing incorporated therein.

Referring to FIG. 22, an embodiment of the invention includes a slotted probe rod 174 having generally the same shape and configuration as probe rods 22, including a first end 176 and a spaced apart second end 178. Intermediate first end 176 and second end 178, slotted probe rod 174 defines a slot 180 sized to accept a purge tubing 182 therethrough. The purge tubing 182 is connected to inner channel 76 to create fluid communication between the nozzle plugs 109 and the purge tubing 182 and allow fluid to be expelled through plug nozzles 109 as the rod assembly 24 is driven into subsurface 14. The expelling of fluid through plug nozzles 109 during insertion of rod assembly 24 into subsurface 14 allows the user to clear any debris entering channel 116 of any nozzle plug 109. Fluid is expelled through plug nozzles 109 periodically in short bursts as needed or desired, or alternatively, fluid is constantly expelled through plug nozzles 109 during the insertion to provide a constant liquid material in channels 116 and prevent the entrance of debris.

A hammer anvil 184 may be removably disposed on the outer end of slotted probe rod 174 to facilitate improved hammering of the rod assembly 24 into subsurface 14. To increase the length of rod assembly 24, after the upper most probe rod 22 has sufficiently penetrated into subsurface 14, the user removes the purge tubing 182 from the upper most probe rod 22, removes the slotted probe rod 174 from the upper most probe rod 22, and thereafter applies another probe rod 22 into the upper most probe rod 22. Once an additional probe rod 22 is applied to the rod assembly 24, the user reattaches purge tubing 182 to the upper most and newly added probe rod 22, reattaches slotted probe rod 174, and reapplies anvil 184. Thereafter, the ramming machine 26 can resume ramming rod assembly 24 into subsurface 14.

Figure 23:
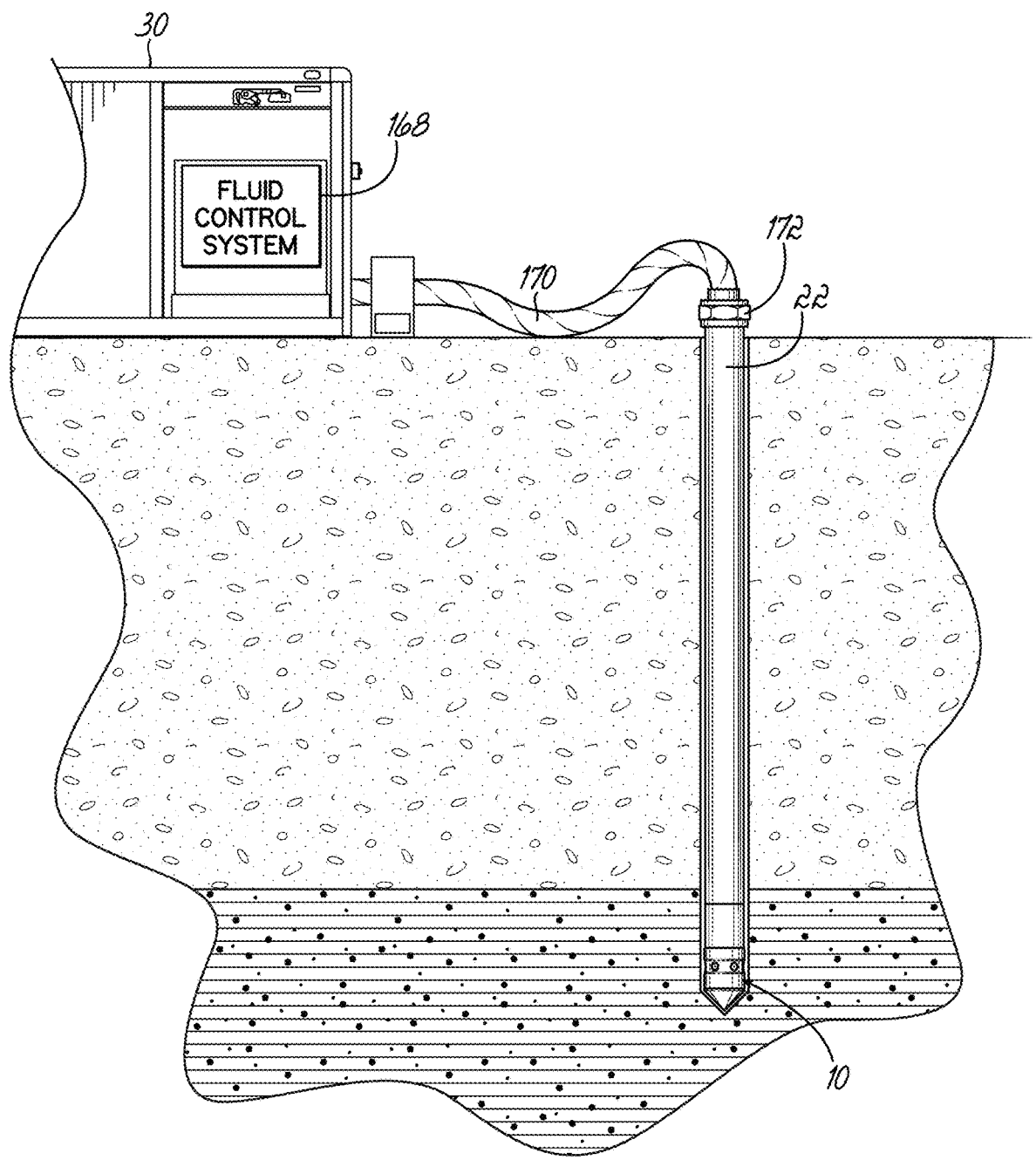
FIG. 23 is a partial cross-sectional view of a rod assembly of the present invention coupled with a fluid control system through tubing.

In an embodiment of the invention, all or part of the structure of the well head 28 is disposed in fluid device 30 or any other suitable location separate and apart from the upper portion of the rod assembly 24. For example, as shown in FIG. 23, the structure provided by well head 28 is incorporated into a fluid control system 168 disposed in fluid device 30. The fluid control system 168 provides similar control over the elements described with respect to rod assembly 24, such as engaging and disengaging a jet fluid inlet, a slurry inlet, a purge fluid inlet, an outlet, or a combination thereof, or any combination of valves related thereto. A tubing 170 is operatively connected to fluid control system 168 at one end and the top portion of the upper most probe rod 22 of rod assembly 24 by way of an attachment head 172. Tubing 170 includes internal channels (not shown) configured to pass the various fluids and slurry used by injection tip assembly 10 from fluid device 30 to rod assembly 24. Further, tubing 170 is configured to collect purge fluid or jet fluid once the fluid has passed through injection tip assembly 10. The used fluid is captured in order to re-inject the fluid back into the system or collect the fluid for proper disposal.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

We claim:

1. An assembly comprising:
   a fluid control system;
   a probe rod in fluid communication with the fluid control system;
   an injection tip coupled to the probe rod and in fluid communication with the fluid control system through the probe rod, the injection tip comprising:
   a nozzle portion;
   a first channel defined by a nozzle head, wherein the first channel is configured to transfer a first substance from the fluid control system through the nozzle portion and to the exterior of the injection tip;
   a second channel defined by the nozzle head, wherein the second channel is configured to:
   collect the first substance from the exterior of the injection tip and transfer the first substance from the injection tip to the fluid control system; and
   transfer a second substance from the fluid control system through the nozzle portion and to the exterior of the injection tip; and
   a drive point releasably connected to the nozzle head via a one-way connection, wherein the one-way connection engages the drive point with the nozzle head when the nozzle head moves in a first direction, and wherein the one-way connection disengages the drive point with the nozzle head when the nozzle head moves in a second direction; and
   a pressure controlling device operatively connected to the fluid control system, wherein the pressure controlling device is configured to:
   control a pressure during the dispensing of the first substance and the dispensing of the second substance, thereby to construct a nucleation cavity of suitable geometry; and
   control the pressure after the dispensing of the first substance and the dispensing of the second substance to cause a hydraulic fracture of desired orientation and form.

2. The assembly of claim 1, wherein the drive point includes a boss and an apex.

3. The assembly of claim 2, wherein the injection tip further comprises:
   a pocket defined by the nozzle head and in fluid communication with the second channel, wherein the pocket is configured to receive the boss therein.

* * * * *